US007952610B2

(12) United States Patent
Okumura et al.

(10) Patent No.: US 7,952,610 B2
(45) Date of Patent: May 31, 2011

(54) INFORMATION PROCESSING APPARATUS, INFORMATION PROCESSING METHOD, STORAGE MEDIUM, AND PROGRAM

(75) Inventors: Akihiro Okumura, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1448 days.

(21) Appl. No.: 11/368,206

(22) Filed: Mar. 3, 2006

(65) Prior Publication Data

US 2006/0208980 A1 Sep. 21, 2006

(30) Foreign Application Priority Data

Mar. 4, 2005 (JP) ................................ P2005-061062

(51) Int. Cl.
*H04N 17/00* (2006.01)
*H04N 17/02* (2006.01)

(52) U.S. Cl. ........................................ 348/191; 348/189

(58) Field of Classification Search .......... 348/189–191, 348/177–186; 382/107, 106
See application file for complete search history.

(56) References Cited

U.S. PATENT DOCUMENTS

| | | | | |
|---|---|---|---|---|
| 5,351,201 | A * | 9/1994 | Harshbarger et al. | 348/187 |
| 7,483,550 | B2 * | 1/2009 | Oka et al. | 382/107 |

FOREIGN PATENT DOCUMENTS

| | | |
|---|---|---|
| JP | 04-100094 | 4/1992 |
| JP | 09-197999 | 7/1997 |
| JP | 2000-102044 | 4/2000 |
| JP | 2001-204049 | 7/2001 |
| JP | 2003-198867 | 7/2003 |

OTHER PUBLICATIONS

Japanese Office Action issued on Oct. 14, 2010, for corresponding Japanese Patent Application JP-2005-061062.
Japanese Office Action issued on Oct. 14, 2010, for corresponding Japanese Patent Application JP-2005-061062.

* cited by examiner

*Primary Examiner* — M. Lee
(74) *Attorney, Agent, or Firm* — K&L Gates LLP

(57) ABSTRACT

An information processing apparatus includes a calculation unit and a conversion unit. A shot of an image displayed on a display under evaluation is taken, and first and second areas are defined in a resultant captured image. The calculation unit performs a calculation such that a pixel value of a pixel in the first area is compared with a pixel value of a pixel in the second area, and the size of an image of a pixel of the display on the captured image, and the angle of the first area with respect to the image of the pixel of the display on the captured image are determined from the comparison result. The conversion unit converts data of the captured image of the display into data of each pixel of the display, based on the size of the image of the pixel and the angle of the first area.

8 Claims, 27 Drawing Sheets

INFORMATION PROCESSING APPARATUS, INFORMATION PROCESSING METHOD, STORAGE MEDIUM, AND PROGRAM

CROSS REFERENCES TO RELATED APPLICATIONS

The present application claims priority to Japanese Patent Application 2005-061062 filed in the Japanese Patent Office on Mar. 4, 2005, the entire contents of which is incorporated herein by reference.

BACKGROUND

The present invention relates to a method, apparatus, storage medium, and a program for processing information, and particularly to a method, apparatus, storage medium, and a program for processing information, that allow it to perform a more accurate evaluation of characteristics of a display.

Various kinds of display devices such as a LCD (Liquid Crystal Display), a PDP (Plasma Display Panel), a DMD (Digital Micromirror Device) (trademark) are now widely used. To evaluate such display devices, a wide variety of methods of measuring characteristics such as luminance value and distribution, a response characteristic, etc., are known.

For example, in hold-type display devices such as a LCD, when a human user watches a moving object displayed on a display screen, that is, when the user watches an image of the object moving on the display screen, eyes of the human observer follow the displayed moving object (that is, the point of interest for the observer moves as the displayed object moves). This causes human eyes to perceive that there is a blur in the image of the object moving on the display screen.

To evaluate the amount of blur perceived by human eyes, it is known to take an image, using a camera, of the motion image displayed on the display device such that light from the image (motion image) displayed on the display device is reflected by a rotating mirror and reflected light is incident on the camera. That is, the image displayed on the display device is reflected in the rotating mirror and the image reflected in the rotating mirror is taken by the camera. In the process of taking the image using the camera, light emerged from the display device is reflected by the mirror and is incident on the camera. If the image is taken by the camera while rotating the mirror at a particular angular velocity, the resultant image taken by the camera is equivalent to an image obtained by taking the image displayed on the display screen while moving the camera with respect to the display screen of the display device. That is, the resultant image taken by the camera is equivalent to a single still image created by combining together a plurality of still images displayed on the display screen, and thus the resultant still image represents a blur perceived by human eyes. In this method, the camera is not directly moved, and thus a moving part (a driving part) for moving the camera is not required.

In another known technique to evaluate a blur due to motion, an image of a moving object displayed on a display screen is taken by a camera at a predetermined time intervals, and image data obtained by taking the image is superimposed by shifting the image data in the same direction as the direction of the movement of the object in synchronization with the movement of the moving object displayed on the display screen so that the resultant superimposed image represents a blur perceived by human eyes (see, for example, Japanese Unexamined Patent Application Publication No. 2001-204049).

However, in the technique in which a rotating mirror is used to obtain an image representing a blur perceived by human eyes, it is difficult to precisely adjust the position and the angle of the rotation axis about which the mirror is rotated, and thus it is difficult to rotate the mirror so as to precisely follow the movement of an object displayed on the screen of the display device. As a result, the resultant obtained image does not precisely represent a blur perceived by human eyes.

Besides, if the camera used to take an image of the display screen (more strictly, the camera used to take an image of an image displayed on the display screen) is set in a position in which the camera is laterally tilted about an axis normal to the screen of the display device under evaluation, the image taken by the camera has a tilt with respect to the display screen of the display device under evaluation by an amount equal to the tilt of the camera. To obtain a correct image, it is needed to precisely adjust the tilt. However, this needs a long time and a troublesome job.

Besides, in the conventional technique, characteristics of the display device are evaluated based on a change in total luminance or color of the display screen of the display under evaluation or based on a change in luminance or color among areas with a size greater than the size of one pixel of the display screen of the display device under evaluation, and thus it is difficult to precisely evaluate the characteristics of the display.

SUMMARY

In view of the above, the present invention provides a technique to quickly and precisely measure and evaluate a characteristic of a display.

According to an embodiment of the present invention, there is provided an information processing apparatus including calculation means for performing a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison, and conversion means for converting data of the captured image of the display under evaluation into data of each pixel of the display under evaluation, based on the size of the image of the pixel and the angle of the first area.

In the calculation performed by the calculation means, an area with a size substantially equal to the size of the image of the pixel may be employed as the first area.

In the calculation performed by the calculation means, a rectangular area located at a substantial center of the captured image of the display under evaluation may be selected as the first area, the display under evaluation being displaying a cross hatch pattern in the form of a two-dimensional array of a plurality of first blocks arranged closely adjacent to each other, first two sides of each first block being formed by lines extending parallel to a first direction of an array of pixels of the display under evaluation, second two sides of each first block being formed by lines extending parallel to a second direction perpendicular to the first direction, the captured image being obtained by taking an image of the display under evaluation when the cross hatch pattern is displayed on the display under evaluation, the rectangular area selected as the first area having a size substantially equal to the size of the image of one first block on the captured image.

In the conversion of data performed by the conversion means, the captured image of the display under evaluation to be converted into data of each pixel of the display under evaluation may be obtained by taking an image of the display under evaluation for an exposure period shorter than a period during which one field or one frame is displayed.

According to an embodiment of the present invention, there is provided an information processing method including the steps of performing a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison, and converting data of the captured image of the display under evaluation into data of each pixel of the display under evaluation, based on the size of the image of the pixel and the angle of the first area.

According to an embodiment of the present invention, there is provided a storage medium in which a program is stored, the program including the steps of performing a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison, and converting data of the captured image of the display under evaluation into data of each pixel of the display under evaluation, based on the size of the image of the pixel and the angle of the first area.

According to an embodiment of the present invention, there is provided a program to be executed by a computer, the program including the steps of performing a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison, and converting data of the captured image of the display under evaluation into data of each pixel of the display under evaluation, based on the size of the image of the pixel and the angle of the first area.

In the information processing apparatus, the information processing method, the storage medium, and the program according to the present invention, a calculation is performed such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison, and data of the captured image of the display under evaluation is converted into data of each pixel of the display under evaluation, based on the size of the image of the pixel and the angle of the first area.

Additional features and advantages are described herein, and will be apparent from, the following Detailed Description and the figures.

DETAILED DESCRIPTION

The present invention can be applied to a measurement system for measuring characteristics of a display. The present invention is described in detail with reference to specific embodiments in conjunction with the accompanying drawings.

Figure 1:
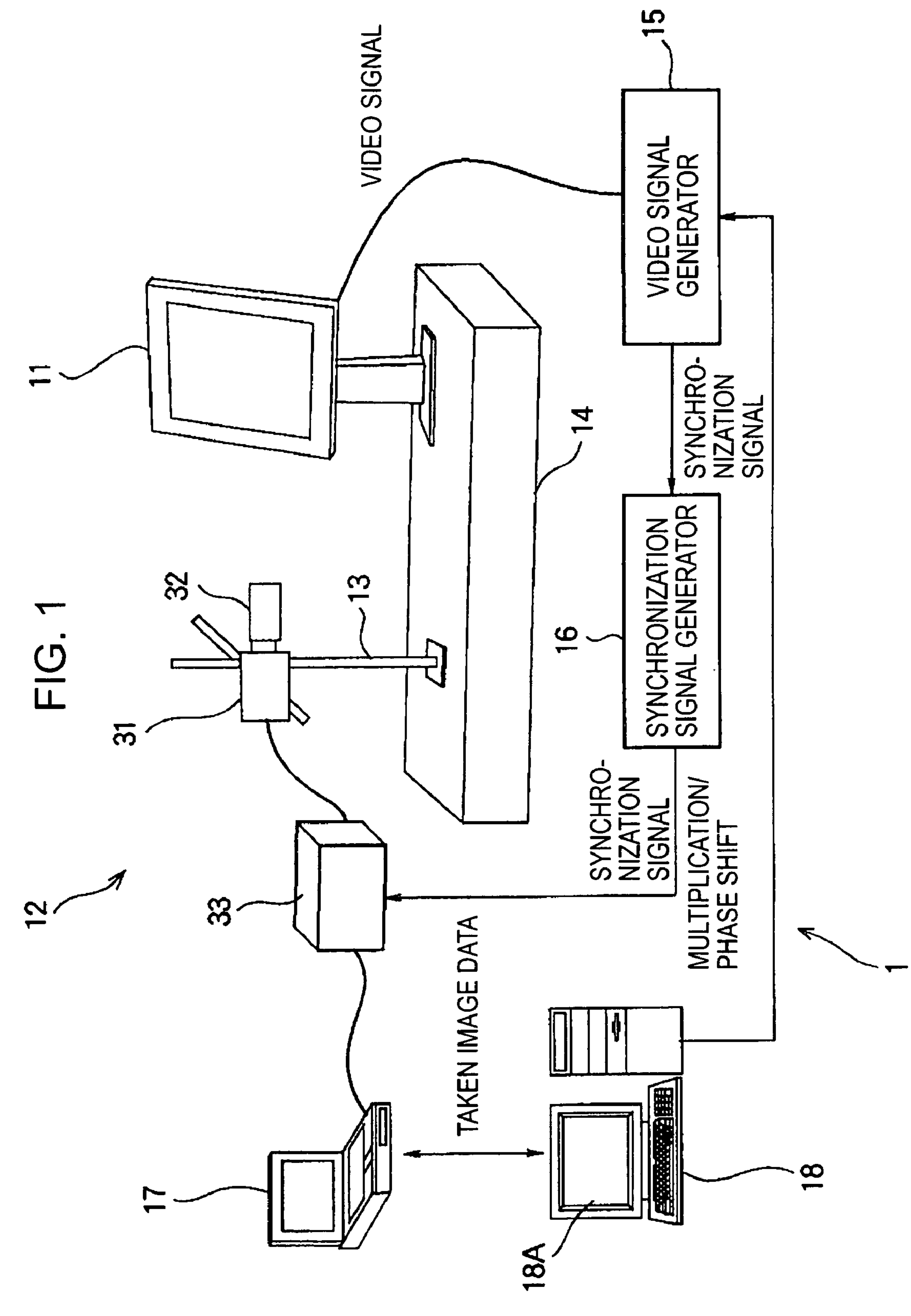
FIG. 1 is a diagram showing a measurement system according to an embodiment of the present invention.

FIG. 1 shows an example of a configuration of a measurement system according to an embodiment of the present invention. In this measurement system 1, an image displayed on a display 11 using a display device such as a CRT (Cathode Ray Tube), a LCD or a PDP, whose characteristics are to be measured, is shot by a high-speed camera 12 such as a CCD (Charged Coupled Device) camera.

The high-speed camera 12 includes a camera head 31, a lens 32, and a main unit 33 of the high-speed camera. The camera head 31 converts an optical image of a subject incident via the lens 32 into an electric signal. The camera head 31 is supported by a supporting part 13, and the display 11 under evaluation and the supporting part 13 are disposed on a horizontal stage 14. The supporting part 13 supports the camera head 31 in such a manner that the angle and the position of the camera head 31 with respect to the display screen of the display 11 under evaluation can be changed. The main unit 33 of the high-speed camera is connected to a controller 17. Under the control of the controller 17, the main unit 33 of the high-speed camera controls the camera head 31 to take an image of an image displayed on the display 11 under evaluation, and supplies obtained image data (captured image data) to a data processing apparatus 18 via the controller 17.

A video signal generator 15 is connected to the display 11 under evaluation and a synchronization signal generator 16 via a cable. The video signal generator 15 generates a video signal for displaying a motion image or a still image and supplies the generated video signal to the display 11 under evaluation. The display 11 under evaluation displays the motion image or the still image in accordance with the supplied video signal. The video signal generator 15 also supplies a synchronization signal with a frequency of 60 Hz synchronous to the video signal to the synchronization signal generator 16.

The synchronization signal generator 16 up-converts the frequency of or shifts the phase of the synchronization signal supplied from the video signal generator 15, and supplies the resultant signal to the main unit 33 of the high-speed camera via the cable. More specifically, for example, the synchronization signal generator 16 generate a synchronization signal with a frequency 10 times higher the frequency of the synchronization signal supplied from the video signal generator 15 and supplies the generated synchronization signal to the main unit 33 of the high-speed camera.

Under the control of the controller 17, the main unit 33 of the high-speed camera converts an analog image signal supplied from the camera head 31 into digital data, and supplies the resultant digital data, as captured image data, to the data processing apparatus 18 via the controller 17. For example, when a calibration (which will be described in further detail later) is performed as to the tilt of the high-speed camera 12 with respect to the display 11 under evaluation, the high-speed camera 12 takes an image of the display screen of the display 11 under evaluation under the control of the controller 17 such that the main unit 33 of the high-speed camera controls the camera head 31 to capture an image of an image displayed on the display 11 under evaluation in synchronization with the synchronization signal supplied from the synchronization signal generator 16 for an exposure period equal to or longer than a 2-field period (for example, 2 to four-field period) so that the resultant captured image includes not a subfield image but a whole field of image.

On the other hand, when a subfield image displayed on the display 11 under evaluation is taken by the high-speed camera 12 to measure a characteristic of the display 11 under evaluation, the main part 33 of the high-speed camera takes the image using the high-speed camera 12 under the control of the controller 17 such that the image displayed on the display 11 under evaluation is taken at a rate of 1000 frames/sec in synchronization with a synchronization signal supplied from the synchronization signal generator 16 so that the subfield image is obtained as the captured image.

When the high-speed camera 12 takes a sufficiently large number of frames per second compared with the number of frames displayed on the display 11 under evaluation, the synchronization signal supplied to the main part 33 of the high-speed camera from the synchronization signal generator 16 does not necessarily need to be synchronous with the synchronization signal supplied from the video signal generator 15.

As for the controller 16 that controls the main part 33 of the high-speed camera, for example, a personal computer or a dedicated control device may be used. The controller 17 transfers the captured image data supplied from the main unit 33 of the high-speed camera to the data processing apparatus 18.

The data processing apparatus 18 controls the video signal generator 15 to generate a prescribed video signal and supply the generated video signal to the display 11 under evaluation. The display 11 under evaluation displays an image in accordance with the supplied video signal.

The data processing apparatus 18 is connected to the controller 17 via a cable or wirelessly. The data processing apparatus 18 controls the controller 17 so that the high-speed camera 12 captures an image of an image (displayed image) displayed on the display 11 under evaluation. The data processing apparatus 18 displays an image on the observing display 18A in accordance with the captured image data supplied from the high-speed camera 12 via the controller 17. Alternatively, the data processing apparatus 18 may display, on the observing display 18A, values which indicate the characteristic of the display 11 under evaluation and which are obtained by performing a particular calculation based on the captured image data. Hereinafter, the image displayed according to the captured image data will also be referred to simply as the captured image.

Furthermore, based on the captured image data supplied from the high-speed camera 12 via the controller 17, the data processing apparatus 18 identifies an image of pixels of the display 11 under evaluation in the image displayed according to the captured image data. More specifically, based on the captured image data obtained by taking an image, via the high-speed camera 12, of the image displayed on the display 11 under evaluation for an exposure time equal to or longer than a time corresponding to one frame (two fields) displayed on the display 11 under evaluation, the data processing apparatus 18 identifies the area of the image of each pixel of the display 11 under evaluation in the image displayed according to the captured image data. The number of images may be counted in fields or frames. In the following discussion, it is assumed that the number of images is counted in fields.

The data processing apparatus 18 then generates an equation that defines a conversion from the captured image data into image data indicating luminance or color components (red (R) component, green (G) component, and blue (B) component) of pixels of the display 11 under evaluation.

According to the generated equation, the data processing apparatus 18 calculates the pixel data indicating luminance or colors of pixels of the display 11 under evaluation from the captured image data supplied from the high-speed camera 12 supplied from the controller 17. For example, according to the generated equation, the data processing apparatus 18 calculates the pixel data indicating luminance or colors of the pixels of the display 11 under evaluation from the captured image data obtained by taking an image of the display 11 under evaluation at a rate of 1000 frames/sec.

Figure 2:
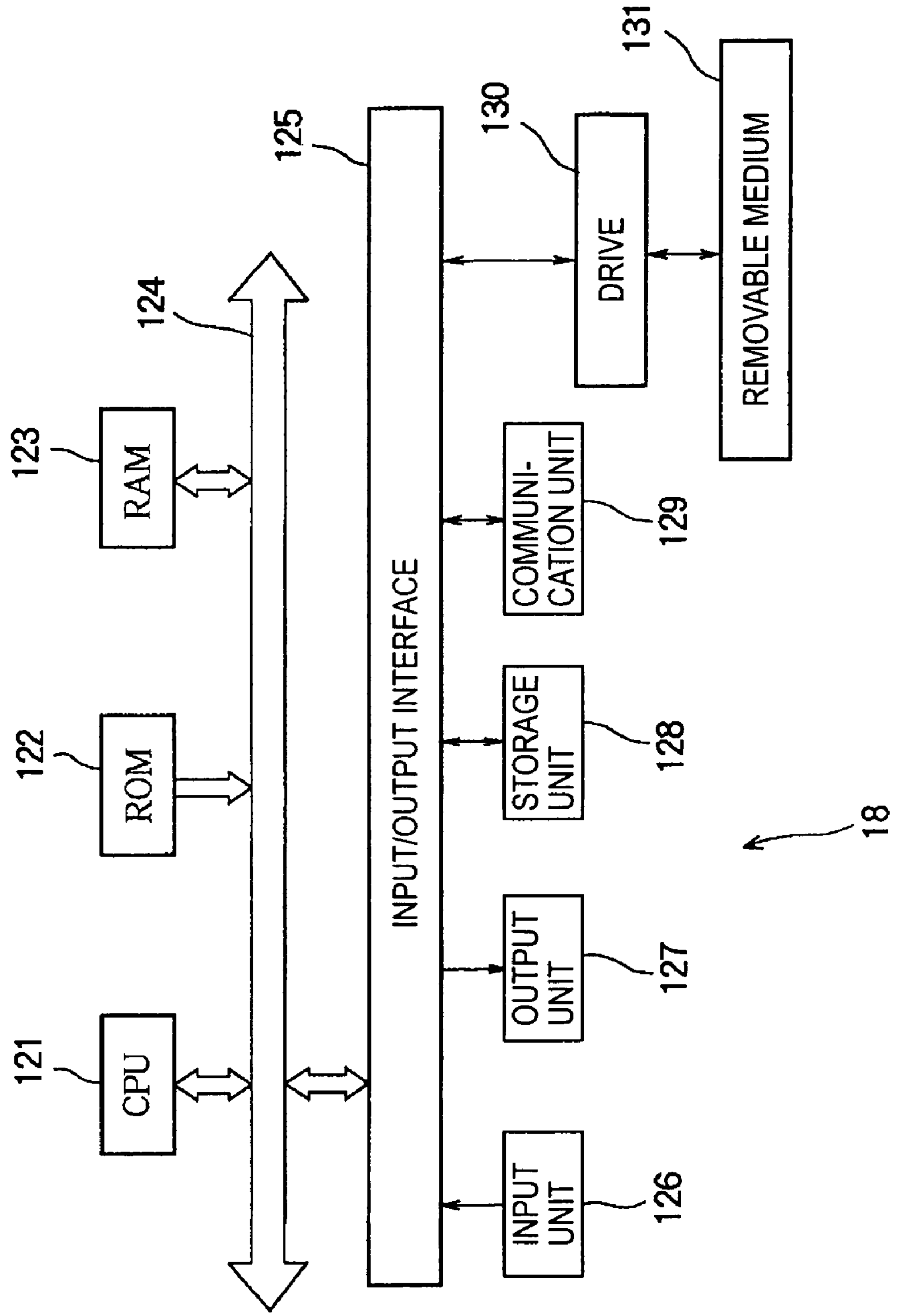
FIG. 2 is a block diagram showing an example of a configuration of a data processing apparatus.

An example of a configuration of the data processing apparatus 18 is shown in FIG. 2. In the example shown in FIG. 2, a CPU (Central Processing Unit) 121 executes various processes in accordance with a program stored in a ROM (Read Only Memory) 122 or a program loaded into a RAM (Random Access Memory) 123 from a storage unit 128. The RAM 123 is also used to store data necessary for the CPU 121 to execute the processes.

The CPU 121, the ROM 122, and the RAM 123 are connected to each other via a bus 124. The bus 124 is also connected to an input/output interface 125.

The input/output interface 125 is also connected to an input unit 126 including a keyboard, a mouse, and the like, an output unit 127 including an observing display 18A such as a CRT or a LCD and speaker, a storage unit 128 such as a hard disk, and a communication unit 129 such as a modem. The communication unit 129 serves to perform communication via a network such as the Internet (not shown).

Furthermore, the input/output interface 125 is also connected to a drive 130, as required. A removable storage medium 131 such as a magnetic disk, an optical disk, a magnetooptical disk, or a semiconductor memory is mounted on the drive 130 as required, and a computer program is read from the removable storage medium 131 and installed into the storage unit 128, as required.

Although not shown in figures, the controller 17 is also configured in a similar manner to that of the data processing apparatus 18 shown in FIG. 2.

When an image displayed on the display 11 under evaluation is taken by the high-speed camera 12, an axis defined based on pixels of the display screen of the display 11 under evaluation is not necessarily parallel to an axis defined in the image taken by the high-speed camera 12.

Figure 3A:
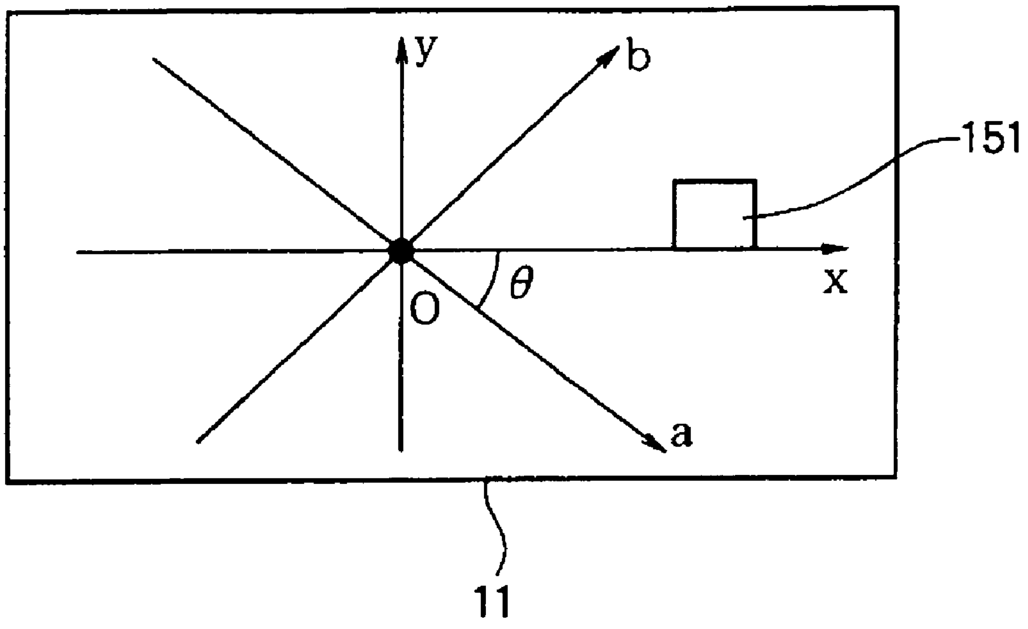
FIGS. 3A and 3B are diagrams illustrating a tilt angle θ of an axis of an image captured by a high-speed camera with respect to an axis defined by a pixel array of a display screen of a display under evaluation.

As shown in FIG. 3A, a x axis and y axis are defined on the display screen of the display 11 under evaluation such that the x axis is parallel to a horizontal direction of an array of pixels of the display screen of the display 11 under evaluation, the y axis is parallel to a vertical direction in of the array of pixels of the display screen of the display 11 under evaluation. In FIG. 3A, a point O is taken at the center of the display screen of the display 11 under evaluation.

Figure 3B:
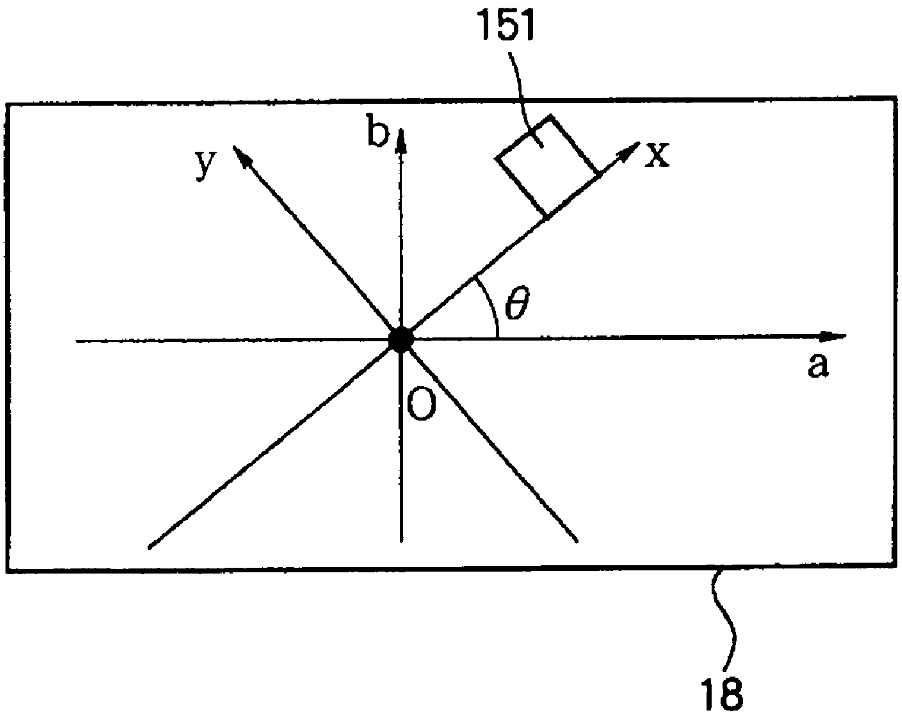

On the other hand, the data processing apparatus 18 processes the image taken by the high-speed camera 12 with respect to an array of pixels of the captured image data. That is, in the data processing apparatus 18, as shown in FIG. 3B, an "a" axis and a "b" axis are defined in the captured image data such that the a axis is parallel to a horizontal direction of an array of pixels of the captured image data and the b axis is parallel to a vertical direction of an array of pixels of the captured image data. In the data processing apparatus 18, a point O is taken at the center of the captured image.

The high-speed camera 12 takes an image in such a manner that an optical image in a field of view (to be taken by the camera) is converted into an image signal using an image sensor of the camera head 31 and captured image data is generated from the image signal. Therefore, the array of pixels of the captured image data is determined by an array of pixels of the image sensor of the high-speed camera 12. In the data processing apparatus 18, the image taken by the camera head 31 is directly displayed. Therefore, the a axis and the b axis of the data processing apparatus 18 are parallel to the horizontal and vertical directions of the high-speed camera 12 (the camera head 31).

From the above-described relationship between the directions of the x and y axes of the display screen of the display 11 under evaluation and the a and b axes of the data processing apparatus 18, it can be concluded that if the camera head 31 is in a position in which the camera head 31 is tilted by an angle θ in a clockwise direction about a direction perpendicular to the display screen of the display 11 under evaluation, the "a" axis of the camera head 31, that is the horizontal direction of the camera head 31 makes an angle θ in the clockwise direction with the x axis of the display 11 under evaluation, that is, the horizontal direction of the display 11 under evaluation, as shown in FIG. 3A. Because the captured image is displayed such that the a axis of the camera head 31 is coincident with the a axis of the data processing apparatus 18, the x axis in the display image makes an angle of θ in a counterclockwise direction with the "a" axis as shown in FIG. 3B.

In other words, if there is a tilt or an angle θ between the horizontal or vertical direction of the pixel array of the optical image of the display 11 under evaluation captured by the high-speed camera 12 and the horizontal or vertical direction of the pixel array of the image sensor of the camera head 31, then an equal tilt or angle appears between the x or y axis defining the horizontal or vertical direction of the pixel array of the display screen of the display 11 under evaluation displayed on the data processing apparatus 18 according to the captured image data and the a or b axis indicating the horizontal or vertical direction of the data processing apparatus 18.

When a part 151 on the display screen of the display 11 under evaluation in FIGS. 3A and 3B denotes a pixel of the display screen of the display 11 under evaluation, if, in the data processing apparatus 18, the captured image data is corrected in terms of the tilt angle θ, then it becomes possible to easily extract data indicating the image of the pixel of the display screen of the display 11 under evaluation from the corrected captured image data.

Thus, when the characteristic of the display 11 under evaluation is evaluated by taking an image, using the high-speed camera 12, an image displayed on the display 11 under evaluation, it is possible to improve the accuracy of the evaluation of the characteristic of the display 11 under evaluation by detecting the tilt angle θ between the axis (the a axis or the b axis) of the image captured by the high-speed camera 12 and the axis (the x axis or the y axis) defining the pixel array of the display screen of the display 11 under evaluation and then correcting the image captured by the high-speed camera 12 based on the detected tilt angle θ. Hereinafter, the process of correcting the image (image data) captured by the high-speed camera 12 in terms of the tilt angle θ between the axis of the image captured by the high-speed camera 12 and the axis of the pixel array of the display screen of the display 11 under evaluation will be referred to as calibration.

In the data processing apparatus 18, when a characteristic of the display 11 under evaluation is evaluated from the displayed image of the display 11 under evaluation, calibration is first performed and then the measurement of the characteristic of the display 11 under evaluation is performed.

Figure 4:
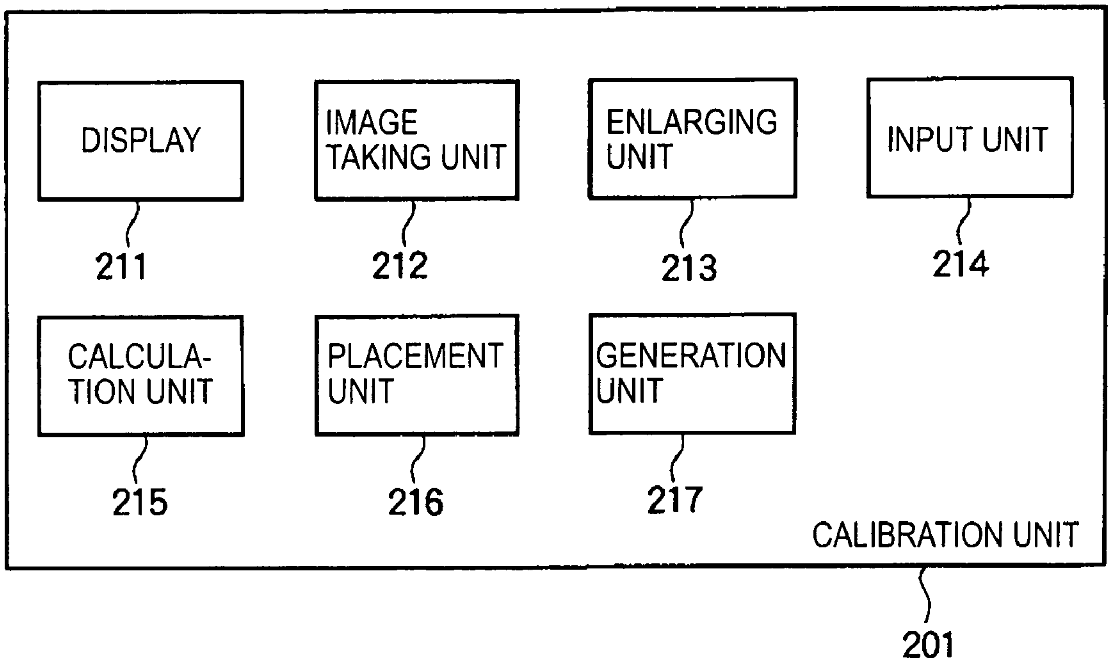
FIG. 4 illustrates functional blocks, implemented mainly by software, of a calibration unit of a data processing apparatus.

FIG. 4 shows functional blocks of a calibration unit of the data processing apparatus 18. Note that the calibration unit is adapted to perform the above-described calibration and the functional blocks thereof are mainly implemented by software.

The calibration unit 201 includes a display unit 211, an image pickup unit 212, an enlarging unit 213, an input unit 214, a calculation unit 215, a placement unit 216, and a generation unit 217.

The display unit 211 is adapted to display an image on the observing display 18A such as a LCD serving as the output unit 127 in accordance with the image data supplied from the enlarging unit 213. The display unit 211 also controls the video signal generator 15 (FIG. 1) to display an image on the display 11 under evaluation. More specifically, the display unit 211 controls the video signal generator 15 to generate a video signal, which is supplied to the display 11 under evaluation, which in turn displays the image in accordance with the supplied video signal.

The image pickup unit 212 takes an image of an image displayed on the display screen of the display 11 under evaluation, by using the high-speed camera 12 connected to the image pickup unit 212 via the controller 17. More specifically, the image pickup unit 212 controls the controller 17 so that the controller 17 controls the high-speed camera 12 to take an image of the image displayed on the display 11 under evaluation.

The enlarging unit 213 controls the zoom ratio of the high-speed camera 12 via the controller 17 so that when pixels of the display 11 under evaluation are displayed on the observing display 18A, the displayed pixels have a size large enough to recognize.

The input unit 214 acquires an input signal generated by an evaluation operator (a user) by operating a keyboard or a mouse serving as the input unit 126, and the input unit 214 supplies the acquired input signal to the image pickup unit 212 or the calculation unit 215.

The calculation unit 215 calculates the tilt angle θ of the axis of the captured image taken by the high-speed camera 12 with respect to the axis of the pixel array of the display screen of the display 11 under evaluation (hereinafter, such a tilt angle θ will be referred to simply as the tilt angle θ), and the calculation unit 215 also calculates the size (pitch), as measured on the display screen of the observing display 18A, of the image of each pixel of the display 11 under evaluation displayed as the captured image on the observing display 18A.

The placement unit 216 places, at a substantial center of the screen of the observing display 18A, a block having a size substantially equal to the size of the captured pixel image in the captured image (hereinafter, such a block will be referred to simply as a reference block) so that the tilt angle θ and the size of a pixel image of the display 11 under evaluation displayed on the screen of the observing display 18A are determined based on the reference block. That is, the placement unit 216 generates a signal specifying the substantial center of the screen of the observing display 18A as the position at which to display the reference block, and the placement unit 216 supplies the generated signal to the display unit 211. On receiving the signal specifying the substantial center of the screen of the observing display 18A as the position at which to display the reference block from the placement unit 216, the display unit 211 displays the reference block at the substantial center of the display screen of the observing display 18A.

Based on the tilt angle θ and the size of the captured pixel image calculated by the calculation unit 215, the generation unit 217 generates the equation defining the conversion of the captured image data into pixel data representing the luminance or colors of pixels of the display 11 under evaluation.

Figure 5:
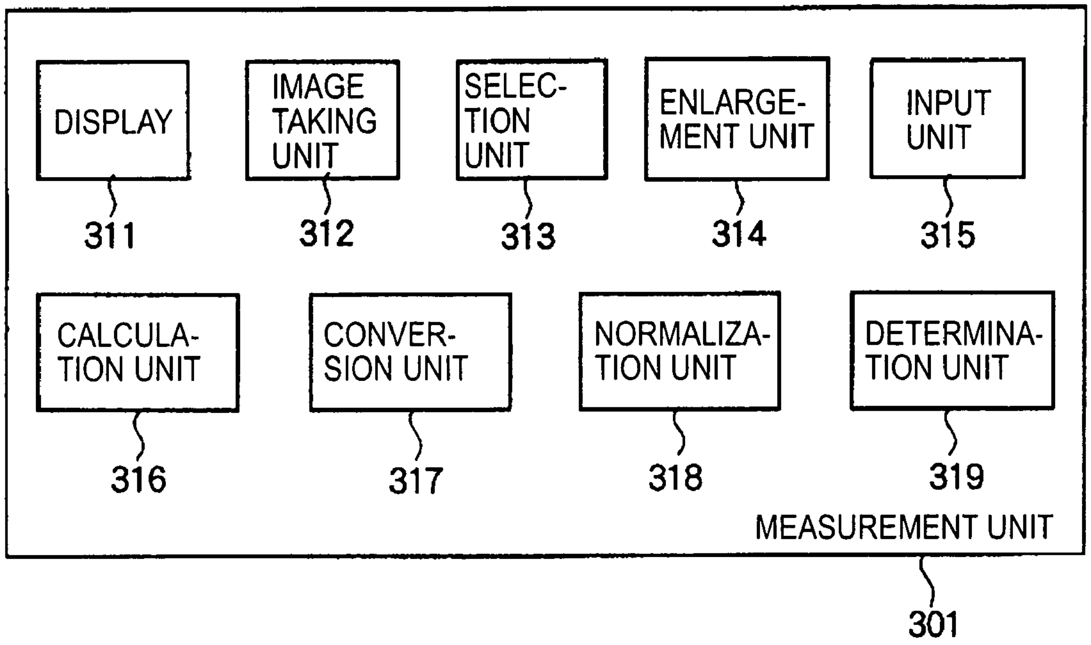
FIG. 5 illustrates functional blocks, implemented mainly by software, of a measurement unit of a data processing apparatus.

FIG. 5 shows functional blocks of a measurement unit of the data processing apparatus 18. Note that the measurement unit is adapted to measure the characteristic of the display 11 under evaluation after the calibration by the calibration unit 201 is completed, and the these functional blocks are mainly implemented by software.

The measurement unit 301 includes a display unit 311, a image pickup unit 312, a selector 313, a enlarging unit 314, a input unit 315, a calculation unit 316, a conversion unit 317, a normalization unit 318, and a determination unit 319.

The display unit 311 displays an image on the observing display 18A in accordance with the image data supplied from the enlarging unit 314. Furthermore, the display unit 311 controls the video signal generator 15 (FIG. 1) so that an image to be evaluated is displayed on the display 11 under evaluation. Hereinafter, the image under evaluation will be referred to simply as the IUE. More specifically, the display unit 311 controls the video signal generator 15 to generate a video signal, which is supplied to the display 11 under evaluation, which in turn displays the image to be evaluated in accordance with the supplied video signal.

The image pickup unit 312 takes an image of the IUE displayed on the display screen of the display 11 under evaluation, by using the high-speed camera 12 connected to the image pickup unit 312 via the controller 17. More specifically, the image pickup unit 312 controls the controller 17 so that the controller 17 controls the high-speed camera 12 to take an image of the IUE displayed on the display 11 under evaluation.

The selector 313 selects one of captured pixel images of the display 11 under evaluation displayed on the observing display 18A.

The enlarging unit 314 controls the zoom ratio of the high-speed camera 12 via the controller 17 so that when pixels of the display 11 under evaluation are displayed on the observing display 18A, the displayed pixels have a size large enough to recognize.

The input unit 315 acquires an input signal generated by a human operator by operating the input unit 126 (FIG. 2) and the input unit 315 supplies the acquired input signal to the image pickup unit 312 or the selector 313.

In accordance with the equation defining the conversion from the captured image data to the pixel data of the display 11 under evaluation, the calculation unit 316 calculates the pixel data of the pixel, selected by the selector 313, of the display 11 under evaluation for each color. Note that the data of the selected pixel of the display 11 under evaluation for respective colors refer to data indicating the intensity value of red (R), green (G), and blue (B) of the pixel, selected by the selector 313, of the display 11 under evaluation. The calculation unit 316 calculates the average of pixel values of the screen of the display 11 under evaluation for each color, based on the pixel values of the display 11 under evaluation obtained from the captured image data via the conversion process performed by the conversion unit 317 for each color. The calculation unit 316 calculates the amount of movement of the moving object displayed on the display 11 under evaluation, based on the tilt angle θ and the size of the pixel (captured pixel image) of the display 11 under evaluation displayed on the observing display 18A.

The conversion unit 317 converts the captured image data into pixel data of the display 11 under evaluation for each color in accordance with the equation defining the conversion from the captured image data in to the pixel data of the display 11 under evaluation. The conversion unit 317 also converts the captured image data into data of respective pixels of the display 11 under evaluation in accordance with the equation defining the conversion from the captured image data into pixel data of the display 11 under evaluation. Note that the data of respective pixels of the display 11 under evaluation refers to data such as luminance data indicating pixel values of respective pixels of the display 11 under evaluation.

The normalization unit 318 normalizes each pixel value of the captured image of the moving object displayed on the display 11 under evaluation. The determination unit 319 determines whether the measurement is completed for all fields displayed on the display 11 under evaluation. If no, the measurement unit 301 continues the measurement until the measurement is completed for all fields.

Now, referring to a flow chart shown in FIG. 6, the calibration process performed by the data processing apparatus 18 is described below.

In step S1, the display unit 211 displays an image to be used as a test image in the calibration process on the display 11 under evaluation. More specifically, the display unit 211 controls the video signal generator 15 to generate a video signal for displaying a test image and supply the generated video signal to the display 11 under evaluation. Based on the video signal supplied from the video signal generator 15, the display 11 under evaluation displays the test image on the display screen of the display 11 under evaluation. For example, when the display 11 under evaluation is designed to display an image in intensity levels from 0 to 256, a white image whose pixels all have an equal level of 240 or higher is used as the test image.

After the test image is displayed on the display 11 under evaluation, if the operator issues a command to take an image of the test image by operating the data processing apparatus 18, an input signal indicating the command to take an image of the test image is supplied from the input unit 214 to the image pickup unit 212. In step S2, the image pickup unit 212 takes an image of the test image (white image) displayed on the display 11 under evaluation by using the high-speed camera 12. That is, in this step S2, in response to the input signal from the input unit 214, the image pickup unit 212 controls the controller 17 so that the high-speed camera 12 takes an image of the displayed test image. Under the control of the controller 17, the high-speed camera 12 takes an image of the test image (white image displayed on the display 11 under evaluation) in synchronization with the synchronization signal from the synchronization signal generator 16.

In this step, the high-speed camera 12 takes an image of the test image displayed on the display 11 under evaluation for an exposure period equal to or longer than a 2-field period (for example, for a 2-field period or a 4-field period). By setting the exposure period to be equal to or longer than the 2-field period, it becomes possible to prevent the high-speed camera 12 from capturing only a subfield image when the display 11 under evaluation is a CRT or a PDP, that is, it is ensured that an image with an equal white level for all pixels is obtained as the captured image of the display 11 under evaluation.

In step S3, the enlarging unit 213 enlarges the captured image of the test image by controlling the zoom ratio of the high-speed camera 12 via the controller 17 so that when pixels of the display 11 under evaluation are displayed on the observing display 18A, the displayed pixels have a size large enough to recognize. The resultant captured image data obtained by taking an image of the test image displayed on the display 11 under evaluation by using the high-speed camera 12 and enlarging the captured image is supplied from the high-speed camera 12 to the data processing apparatus 18 via the controller 17. The display unit 211 transfers the captured image data supplied from the enlarging unit 213 to the observing display 18A, which displays the enlarged test image (more strictly, the enlarged captured image of the test image) in accordance with the received captured image data.

After the test image is displayed on the observing display 18A, the operator operates the data processing apparatus 18 to specify the size (X1, Y1) of the reference block to be displayed on the display screen of the observing display 18A. In response, an input signal indicating the size (X1, Y1) of the reference block specified by the operator is supplied from the input unit 214 to the calculation unit 215. In step S4, the calculation unit 215 sets the size of the reference block to (X1, Y1) in accordance with the input signal supplied from the input unit 214.

Note that values of X1 and Y1 defining the size of the reference block respectively indicate lengths of a first side and a second side (perpendicular to each other) of the reference block displayed on the observing display 18A. The operator predetermines the size of one pixel (captured pixel image) of the display 11 under evaluation as displayed on the display screen of the observing display 18A, and the operator inputs X1 and Y1 indicating the predetermined size. For example, in a case in which the display unit 211 displays the captured image on the observing display 18A and also displays a rectangle as the reference block 401 at the center of the screen of the observing display 18A as shown in FIG. 7, the calculation unit 215 sets the length of the horizontal sides (that is, the horizontal size) of the reference block 401 to X1 and the length of the vertical sides (vertical size) to Y1 in accordance with the input signal supplied from the input unit 214.

Figure 7:
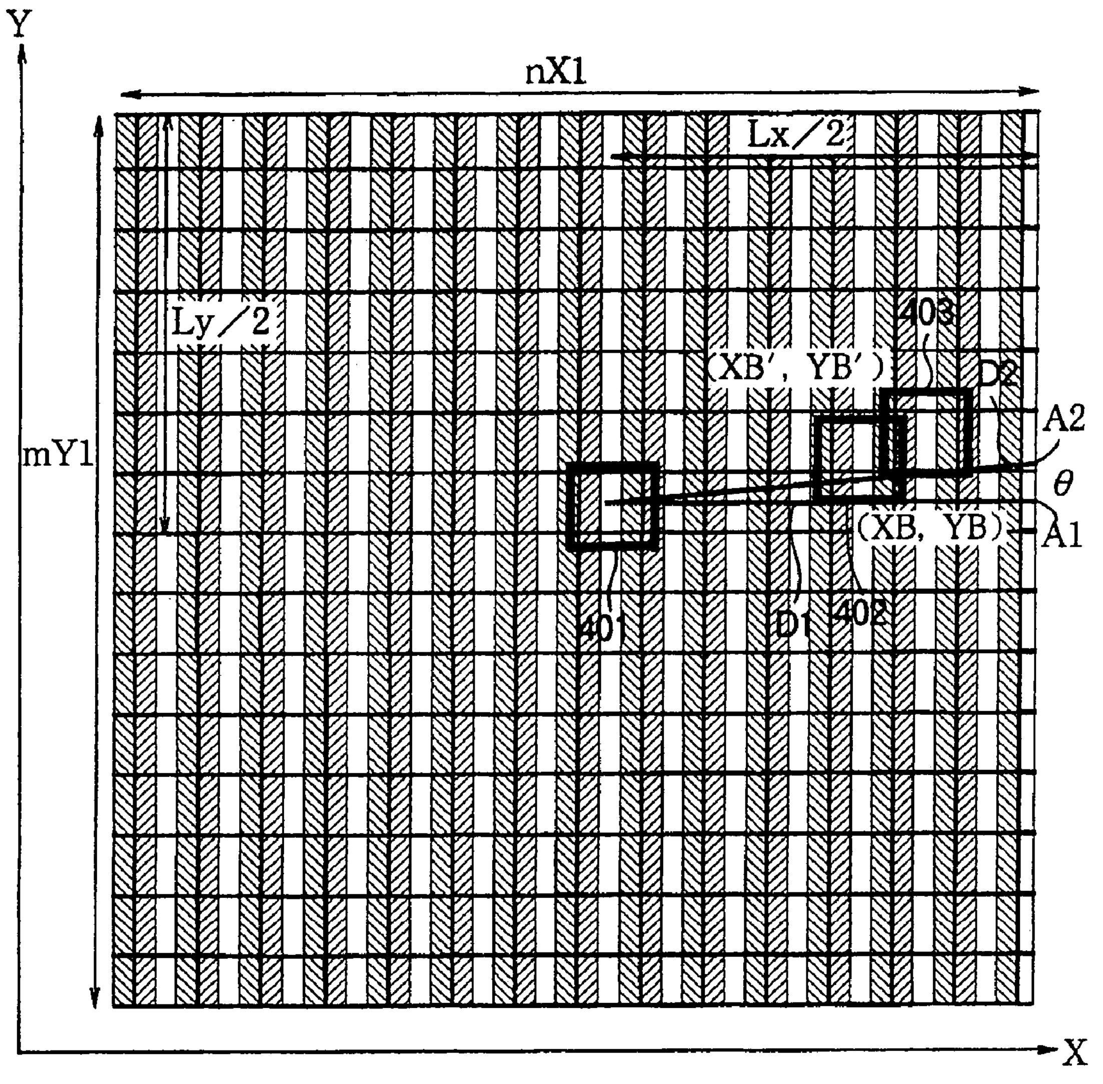
FIG. 7 is diagram illustrating a calibration process.

In FIG. 7, a rectangle at the center denotes the reference block 401. In this reference block 401 shown in FIG. 7, a rectangular area hatched with lines sloping upwards from left to right, a rectangular area with no hatching lines, and a rectangular area hatched with lines sloping downwards from left to right respectively denote R, G, and B areas of an image (taken by the high-speed camera 12) of one pixel of the display 11 under evaluation. More specifically, in FIG. 7, the rectangle hatched with lines sloping upwards from left to right and located on the left-hand side in the captured pixel image denotes a red (R) light emitting area of a pixel (corresponding to the captured pixel image) of the display screen of the display 11 under evaluation. The rectangle hatched with no lines and located in the center of the captured pixel image denotes a green (G) light emitting area of the pixel (corresponding to the captured pixel image) of the display screen of the display 11 under evaluation. The rectangle hatched with lines sloping downwards from left to right and located on the right-hand side in the captured pixel image denotes a blue (B) light emitting area of the pixel (corresponding to the captured pixel image) of the display screen of the display 11 under evaluation.

In FIG. 7, the captured image includes a two-dimensional array of rectangles corresponding to the respective pixels of the display 11 under evaluation.

Figure 6:
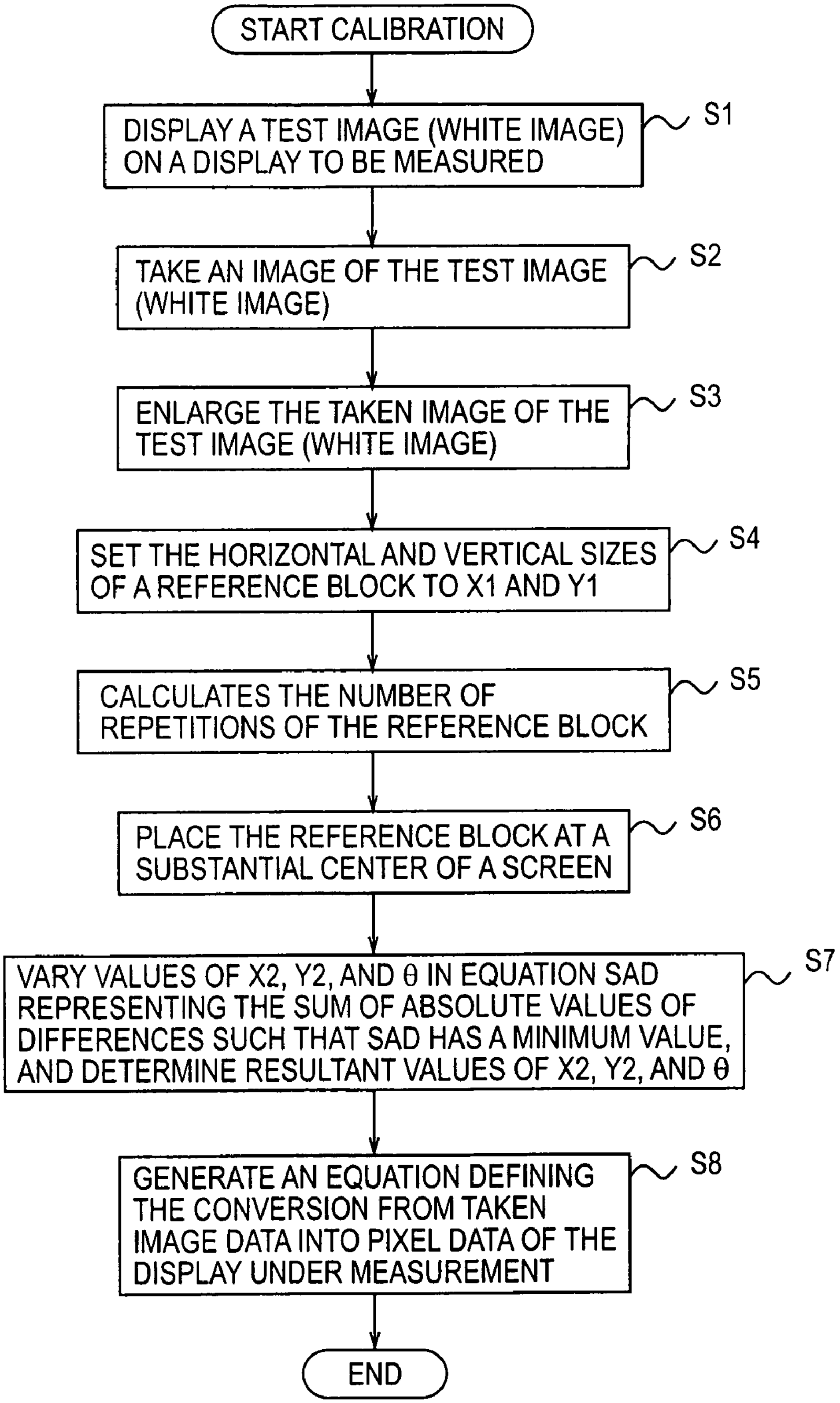
FIG. 6 is a flow chart illustrating a calibration process.

Referring again to the flow chart shown in FIG. 6, in step S5 after completion of setting the size of the reference block 401 in step S4, the calculation unit 215 calculates the number of repetitions of the reference block 401 based on the size of the captured image and the set size of the reference block 401. Note that the number of repetitions of the reference block 401 refers to the number of blocks that are identical in shape and size to the reference block 401 and that can be placed at adjacent positions in the X or Y direction starting from the left-hand end to the right-hand end of the captured image.

For example, in FIG. 7, when the direction from left to right along the bottom edge of the captured image in FIG. 7 is defined as a X direction, the direction from bottom to top along the left-hand edge of the captured image is defined as a Y direction, the size (length) of the captured image in the X direction is equal to Lx (and thus one half of the size is equal to Lx/2), and the size (length) of the captured image in the Y direction is equal to Ly (and thus one half of the size is equal to Ly/2), the calculation unit 215 calculates the number, n, of repetitions of the reference block 401 in the X direction and the number, m, of repetitions of the reference block 401 in the Y direction from Lx indicating the size of the captured image in the X direction, Ly indicating the size of the captured image in the Y direction, X1 indicating the size of the reference block 401 in the X direction, and Y1 indicating the size of the reference block 401 in the Y direction, in accordance with equations (1) and (2) shown below.

$$n = Lx/X1 \quad (1)$$

$$m = Ly/Y1 \quad (2)$$

Note that the number, n, of repetitions of the reference block 401 in the X direction refers to the number of blocks that are identical in shape and size to the reference block 401 and that are arranged in the X direction starting from the left-hand end to the right-hand end of the captured image. Similarly, the number, m, of repetitions of the reference block 401 in the Y direction refers to the number of blocks that are identical in shape and size to the reference block 401 and that are arranged in the Y direction starting from the bottom end to the top of the captured image. Thus, as shown in FIG. 7, the size Lx of the captured image in the X direction can also be expressed as nX1, and the size Ly of the captured image in the Y direction can also be expressed as mY1.

Referring again to the flow chart shown in FIG. 6, in step S6 after step S5 in which the calculation unit 215 calculates the number of repetitions of the reference block 401, the placement unit 216 places the reference block 401 at a substantial center of the observing display 18A.

More specifically, in this step S6, from the values of X1 and Y1 indicating the size of the reference block 401 set by the calculation unit 215, the placement unit 216 generates a signal indicating the substantially center of the observing display 18A at which to display the reference block 401 with horizontal and vertical sizes equal to X1 and Y1, and the placement unit 216 supplies the generated signal to the display unit 211. If the display unit 211 receives, from the placement unit 216, the signal indicating the substantial center of the observing display 18A at which to display the reference block 401, the display unit 211 displays the reference block 401 at the substantial center of the observing display 18A in a manner in which the reference block 401 is superimposed on the captured image as shown in FIG. 7.

If the reference block 401 is displayed on the captured image (the observing display 18A), the calculation unit 215 corrects the position of a block (hereinafter, referred to as a matching sample block) having a size equal to that of the reference block 401 and located at a particular position on the captured image, based on the tilt angle θ (variable) of the axis of the captured image captured by the high-speed camera 12 with respect to the axis of pixel array of the display screen of the display 11 under evaluation. The calculation unit 215 determines the value of the tilt angle θ that minimizes the absolute value of the difference between the luminance of a pixel in the matching sample block located at the corrected position and the luminance of the pixel in the reference block 401, and also determines the size (pitch) (X2, Y2) of the captured pixel image of the captured image (the pixel of the display 11 under evaluation).

More specifically, in step S7, the calculation unit 215 calculates the value of SAD indicating the sum of absolute values of differences for various X2, Y2, and the tilt angle θ, and determines the values of X2, Y2, and the tilt angle θ for which SAD has a minimum value.

For example, in FIG. 7, when the position of a particular point is represented by coordinates (XB, YB) in a coordinate system defined such that a lower left vertex (an intersection between a left-hand side and a lower side) of the reference block 401 is employed as the origin, and axes are selected so as to be parallel to the X and Y directions, XB and YB are given by equations (3) and (4) shown below.

$$XB = k \times X2 \quad (3)$$

$$YB = 1 \times Y2 \quad (4)$$

where X2 is the pitch of captured pixel images (pixels of the display 11 under evaluation on the captured image) in the X direction, Y2 is the pitch of captured pixel images in the Y direction, and k and 1 are integers ($-n/2 \leqq k \leqq n/2$ and $-m/2 \leqq 1 \leqq m/2$, where n is the number of repetitions of the reference block 401 in the X direction, and m is the number of repetitions of the reference block 401 in the Y direction).

Next, based on the tilt angle θ, a correction is made as to the position of a matching sample block 402 whose one vertex lies at point (XB, YB) and another vertex lies on a straight line extending parallel to the X direction and passing through point (XB, YB). In FIG. 7, a matching sample block 403 represents the matching sample block 402 at the position corrected based on the tilt angle θ. Coordinates XB' and YB' of a vertex (XB', YB') of the matching sample block 403 corresponding to the vertex (XB, YB) of the matching sample block 402 are respectively expressed by equations (5) and (6).

$$XB' = XB + YB \times \theta(Ly/2) \quad (5)$$

$$YB' = YB + XB \times \theta(Lx/2) \quad (6)$$

Herein, as shown in FIG. 7, let A1 denote a point at which a straight line D1 having a length of Lx/2, extending parallel to the X direction, and passing though point (XB, YB) intersects a right-hand edge of the captured image, and let A2 denote a point at which a straight line D2 passing an end point of the line D1 opposite to point A1 and also passing through point (XB', YB') intersects the right-hand edge of the captured image, then the tilt angle θ is approximately given by the distance from point A1 to point A2. Note that the position of point (XB', YB') is given by parallel moving point (XB, YB) by a particular distance in a particular direction determined based on the tilt angle θ.

When the position of point (XB, YB) is corrected to point (XB', YB') based on the tilt angle θ, the calculation unit 215 calculates the value SAD indicating the sum of absolute values of differences given by equation (7) for various values of X2, Y2, and θ, and determines values of X2, Y2, and θ for which SAD have a minimum value.

$$SAD = \sum_{i=0}^{X1}\sum_{j=0}^{Y1}\sum_{k=-\frac{n}{2}}^{\frac{n}{2}}\sum_{l=-\frac{m}{2}}^{\frac{m}{2}} |Ys(i,\ j) - Yr(XB' + i,\ YB' + j)| \quad (7)$$

where Σ at the leftmost position indicates that Ys(i, j)−Yr (XB'+i, YB'+j) should be added together for i=0 to x1, and Σ at the second to fourth positions indicate that |Ys(i, j)−Yr (XB'+i, YB'+j) should be added together for j=0 to Y1, k=−n/2 to n/2, and l=−m/2 to m/2, respectively.

In equation (7), Ys(i, j) denotes the luminance at point (i, j) in the reference block 401 where 0≦i≦X1 and 0≦j≦Y1. Yr(XB'+i, YB'+j) denotes the luminance at point (XB'+i, YB'+j) in the matching sample block 403 where 0≦i≦X1 and 0≦j≦Y1.

When X2, Y2, and θ in equation (7) representing the sum of absolute values of differences are varied in the above calculation, X2 is varied within a range of X1±10% (that is, X1±X1/10), Y2 is varied within a range of Y1±10% (that is, Y1±Y1/10), and the tilt angle θ is varied within a range of ±10 pixels (captured pixel images). Thus, in the example shown in FIG. 7, the matching sample block 403 corresponding to the matching sample block 402 is obtained by varying θ within the range from a 10th pixel (captured pixel image) as counted upwards (in the Y direction) from point A1 to a 10th pixel (captured pixel image) as counted downwards (in a direction opposite to the Y direction) from point A1 such that SAD has a minimum value.

Referring again to the flow chart shown in FIG. 6, if X2, Y2 and θ that minimize SAD given by equation (7) indicating the sum of absolute values of differences are determined, then in step S8, the generation unit 217 generates an equation that defines the conversion from the captured image data into pixel data of the display 11 under evaluation.

More specifically, in step S8, the generation unit 217 generates the equation that defines the conversion from the captured image data into pixel data of the display 11 under evaluation, by substituting values of X2, Y2 and θ that minimize SAD indicating the sum of absolute values of differences given by equation (7) into equations (5) and (6) (equations (3) and (4)).

Figure 8:
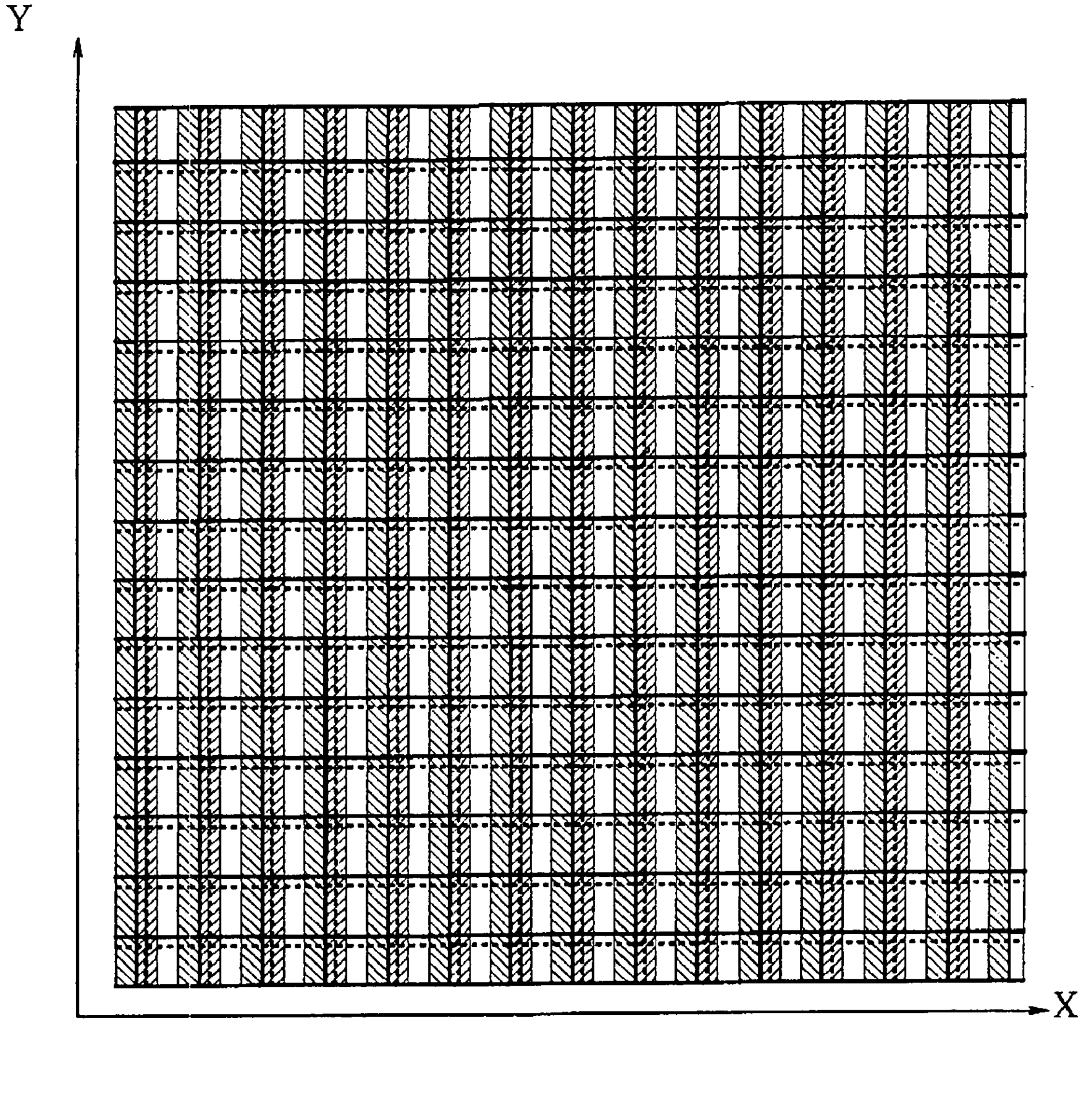
FIG. 8 shows an example of a display screen obtained as a result of determination of values of X2, Y2, and θ that minimize SAD indicating the sum of absolute values of differences.

After the calibration process is completed, the display unit 211 displays on the observing display 18A the result of the calculation of X2, Y2, and θ for which SAD has a minimum value, as shown in FIG. 8. In FIG. 8, as in FIG. 7, each captured pixel image is represented by a rectangle including a rectangular area hatched with lines sloping upwards from left to right, a rectangular area with no hatching lines, and a rectangular area hatched with lines sloping downwards from left to right. Note that in FIG. 8, each captured pixel image (more strictly, each pixel of the display 11 under evaluation on the captured image) is in a rectangle (a block) formed by horizontal and vertical broken lines that show the result of the calculation of the minimum value of SAD. A lower left vertex of each rectangle defined by these broken lines (that is, each rectangle bound by the vertical and horizontal broken lines) corresponds to point (XB', YB'). Note that in FIG. 8, for the purpose of illustration, rectangles indicating captured pixel images surrounded by broken lines are slightly shifted from actual positions of captured pixel images. Each rectangle defined by broken lines has a size of X2 in the direction and Y2 in the Y direction. This means that the position of the lower left vertex of each captured pixel image, the tilt angle θ, the size of each captured pixel image in the X direction, and the size of each captured pixel image in the Y direction have been correctly determined.

That is, when the test image (the white image) consisting of pixels having equal luminance is displayed on the display 11 under evaluation, and the displayed test image is captured via the high-speed camera 12 and displayed as the captured image on the observing display 18A, it is possible to easily detect a pixel (a captured pixel image) of the display 11 under evaluation on the captured image by comparing the luminance at a particular point in the reference block 401 with the luminance at a particular point in the matching sample block 403, and thus it is possible to precisely determine the position of the lower left vertex of each captured pixel image, the tilt angle θ, the size of each captured pixel image in the X direction, and the size of each captured pixel image in the Y direction.

From the test image captured by the camera, the data processing apparatus 18 determines the tilt angle θ and the size (pitch) (X2 and Y2) of captured pixel images (pixels of the display 11 under evaluation) on the captured image, in the above-described manner.

Thus, by determining the tilt angle θ and the size (X2 and Y2) of captured pixel images on the captured image of the test image in the above-described manner, the data processing apparatus 18 can identify the position and the size of each captured pixel image on the captured image and can evaluate the characteristic of each pixel of the display 11 under evaluation. Thus, it is possible to quickly and precisely measure and evaluate the characteristic of the display 11 under evaluation.

In the embodiment described above, the calibration is performed by determining the size (X2 and Y2) of the captured pixel image on the captured image by using the reference block having a size substantially equal to the size of the captured pixel image. Alternatively, the tilt angle θ and the size of the pixel (the captured pixel image) of the display 11 under evaluation on the captured image may also be determined such that a cross hatch pattern consisting of cross hatch lines spaced apart by a distance equal to an integral multiple of (for example, ten times greater than) the size of one pixel of the display 11 under evaluation is displayed as a test image on the display 11 under evaluation, and the size of each block defined by adjacent cross hatch lines may be determined by using a reference block with a size substantially equal to the size of the block defined by adjacent cross hatch lines displayed on the display screen of the observing display 18A.

Referring to a flow chart shown in FIG. 9, a process performed by the data processing apparatus 18 to perform calibration based on the cross hatch image displayed on the display 11 under evaluation is described below.

In step S21, the display unit 211 displays the cross hatch image as the test image in the center of the display screen of the display 11 under evaluation. More specifically, the display unit 211 controls the video signal generator 15 to generate a video signal for displaying the cross hatch image and supply the generated video signal to the display 11 under evaluation. Based on the video signal supplied from the video signal generator 15, the display 11 under evaluation displays the cross hatch image as the test image on the display screen of the display 11 under evaluation.

Figure 10:
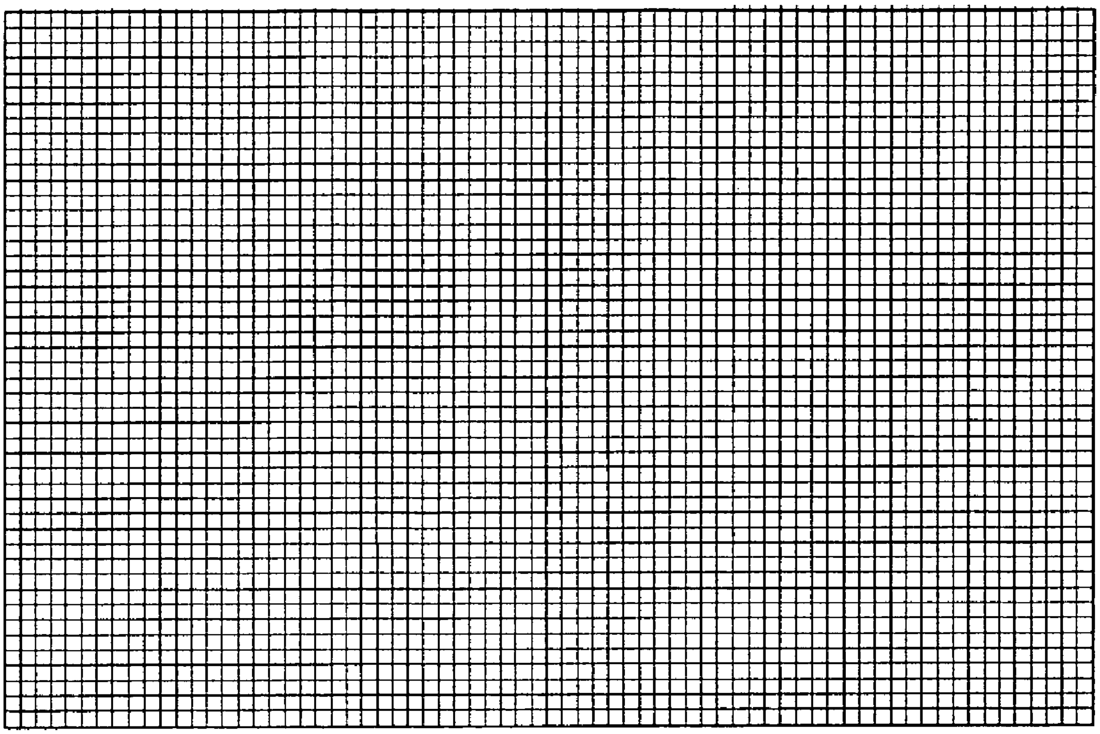
FIG. 10 is a diagram showing a cross hatch pattern displayed on a display under evaluation.

FIG. 10 shows an example of the cross hatch image displayed in the center of the display screen of the display 11 under evaluation. In the example shown in FIG. 10, rectangular blocks are defined by solid lines (cross hatch lines) and blocks are arranged in the form of a two-dimensional array. Note that hereinafter, a block defined by cross hatch lines will be referred to simply as a cross hatch block. Each cross hatch block has a size, for example, ten times greater in X and Y directions than the size of one pixel of the display 11 under evaluation. In this case, each cross hatch block includes 100 (=10×10) pixels of the display 11 under evaluation. In other words, each cross hatch block is displayed by 100 pixels of the display 11 under evaluation.

In FIG. 10, each horizontal solid line (horizontal cross hatch line) has a width (as measured in the vertical direction), for example, equal to the size of one pixel of the display 11 under evaluation. Similarly, in FIG. 10, each vertical solid line (vertical cross hatch line) has a width (as measured in the horizontal direction), for example, 3 times the size of one pixel of the display 11 under evaluation.

Figure 9:
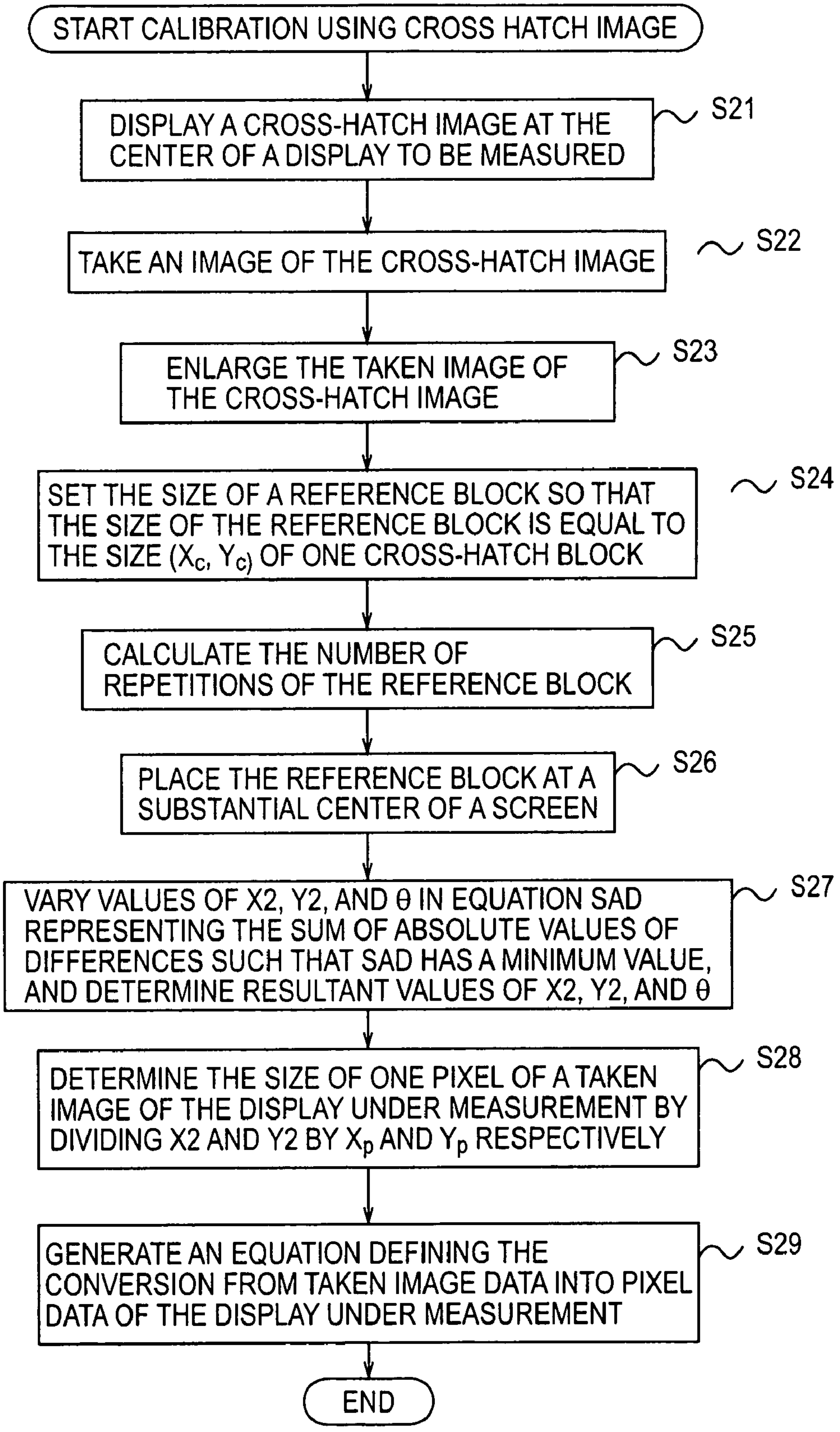
FIG. 9 is a flow chart illustrating a calibration process using a cross hatch pattern.

Referring again to the flow chart shown in FIG. 9, after the cross hatch image is displayed as the test image on the display 11 under evaluation, if the operator issues a command to take an image of the test image by operating the data processing apparatus 18, an input signal indicating the command to take an image of the test image is supplied from the input unit 214 to the image pickup unit 212. In step S22, the image pickup unit 212 takes an image of the cross hatch image displayed on the display 11 under evaluation by using the high-speed camera 12. That is, in this step S22, in response to the input signal from the input unit 214, the image pickup unit 212 controls the controller 17 so that the high-speed camera 12 takes an image of the displayed test image. Under the control of the controller 17, the high-speed camera 12 takes an image of the test image in the form of the cross hatch image displayed on the display 11 under evaluation in synchronization with the synchronization signal supplied from the synchronization signal generator 16.

Figure 11:
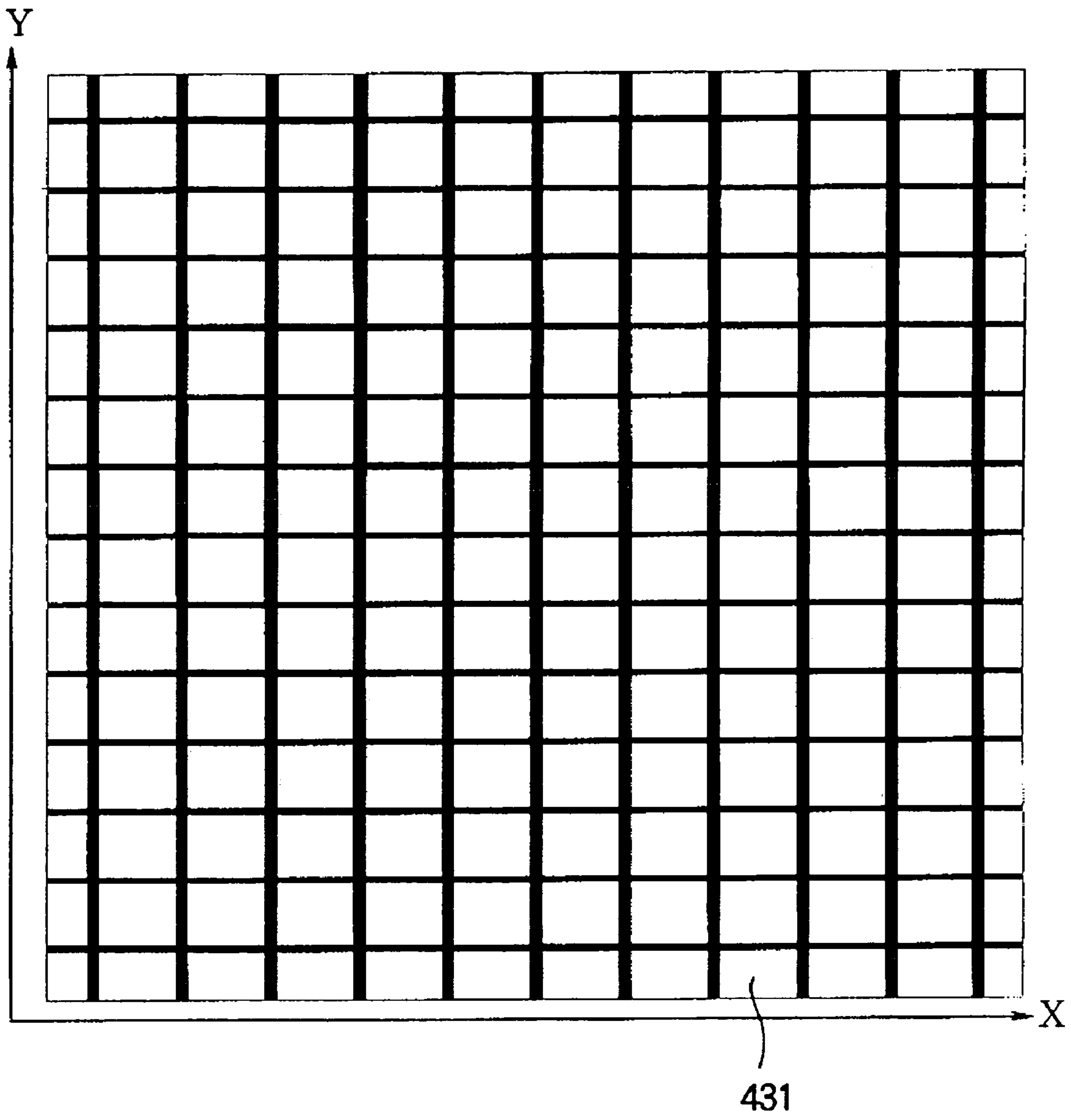
FIG. 11 shows an example of a captured and displayed image of a cross hatch pattern.

In step S23, the enlarging unit 213 controls the zoom ratio of the high-speed camera 12 via the controller 17 such that when the image of the cross hatch image displayed on the display 11 under evaluation is displayed on the observing display 18A, each cross hatch block has a size large enough to distinguish on the observing display 18A. The resultant captured image data obtained by taking an image of the test image displayed on the display 11 under evaluation by using the high-speed camera 12 and enlarging the captured image is supplied from the high-speed camera 12 to the data processing apparatus 18 via the controller 17. The display unit 211 transfers the captured image data supplied from the enlarging unit 213 to the observing display 18A, which displays the enlarged test image (captured image) in the form of the cross hatch image. FIG. 11 illustrates an example of the cross hatch image displayed on the observing display 18A.

In the example shown in FIG. 11, the captured image includes cross hatch blocks arranged in X and Y directions in the form of an array. A block 431 defined by solid lines represents one cross hatch block on the captured image. The data processing apparatus 18 regards one block 431 as one captured pixel image (one pixel of the display 11 under evaluation on the captured image displayed on the observing display 18A) in the process described above with reference to the flow chart shown in FIG. 6, and the data processing apparatus 18 performs a process in a similar manner as in steps S4 to S7 shown in FIG. 6.

More specifically, after the captured image of the cross hatch image (the test image) is displayed on the observing display 18A, the operator operates the data processing apparatus 18 to input a value XC substantially equal to the size, in the X direction, of one cross hatch block displayed on the display screen of the observing display 18A ad a value YC substantially equal to the size in the Y direction thereby specifying the size of a reference block to be displayed on the display screen of the observing display 18A. In response, an input signal indicating the size (XC, YC) of the reference block specified by the operator is supplied from the input unit 214 to the calculation unit 215. In step S24, the calculation unit 215 sets the X-directional size of the reference block to XC, which is equal to the X-directional size of one cross hatch block 431 on the captured image, and also sets the Y-directional size of the reference block to YC, which is equal to the Y-directional size of one cross hatch block, in accordance with the input signal supplied from the input unit 214.

Thereafter, steps S25 to S27 are performed. These steps are similar to steps S5 to S7 shown in FIG. 6, and thus a duplicated expression thereof is omitted herein. Note that in the process in steps S25 to S27, XC and YC respectively correspond to X1 and Y1 indicating the size of the reference block 401 in the process described above with reference the flow chart shown in FIG. 6, and the X-directional size and the Y-directional size of one cross hatch block shown in FIG. 11 respectively correspond to X2 and Y2 determined in step S27 in the flow chart shown in FIG. 6.

In step S28, the calculation unit 215 divides the determined value of X2 by Xp indicating the predetermined number of pixels included, in the X direction, in one cross hatch block on the display screen of the display 11 under evaluation, and Y2 by Yp indicating the predetermined number of pixels included, in the Y direction, in one cross hatch block on the display screen of the display 11 under evaluation, thereby determining the size (pitch) of one pixel (captured pixel image) of the display 11 under evaluation on the captured image displayed on the observing display 18A.

More specifically, when the number of pixels (on the display 11 under evaluation) included, in the X direction, in one cross hatch block (corresponding to one cross hatch block 431 shown in FIG. 11) on the display screen of the display 11 under evaluation is given by Xp, and the number of pixels (on the display 11 under evaluation) included, in the Y direction, in one cross hatch block is given by Yp, if SAD indicating the sum of absolute values of differences has a minimum value when the X-directional size of the block 431 is X2 and the Y-directional size is Y2, the calculation unit 215 determines Xd and Yd respectively indicating the X-directional size and the Y-directional size of one pixel (captured pixel image) of the display 11 under evaluation on the captured image displayed on the display screen of the observing display 18A in accordance equations (8) and (9) shown below.

$$Xd=X2/Xp \tag{8}$$

$$Yd=Y2/Yp \tag{9}$$

Note that the number, Xp, of pixels included in the X direction in one cross hatch block and the number, Yp, of pixels included in the Y direction have been predetermined, that is, when a cross hatch image is displayed on the display 11 under evaluation, each block of the cross hatch image is displayed by an array of pixels, whose number in the X direction is Xp and whose number in the Y direction is Yp, of the display 11 under evaluation.

If Xd and Yd respectively indicating the X-directional size and the Y-direction size of one pixel (captured pixel image) of the display 11 under evaluation on the captured image are determined, then in step S29, the generation unit 217 generates an equation defining the conversion from the captured image data to the pixel data of the display 11 under evaluation.

Note that the equation defining the conversion from the captured image data to the pixel data of the display 11 under evaluation can be generated by replacing X2 and Y2 respectively by Xd and Yd in step S8 shown in FIG. 6 and substituting Xd and Yd, instead of X2 and Y2, into equations (5) and (6).

Figure 12:
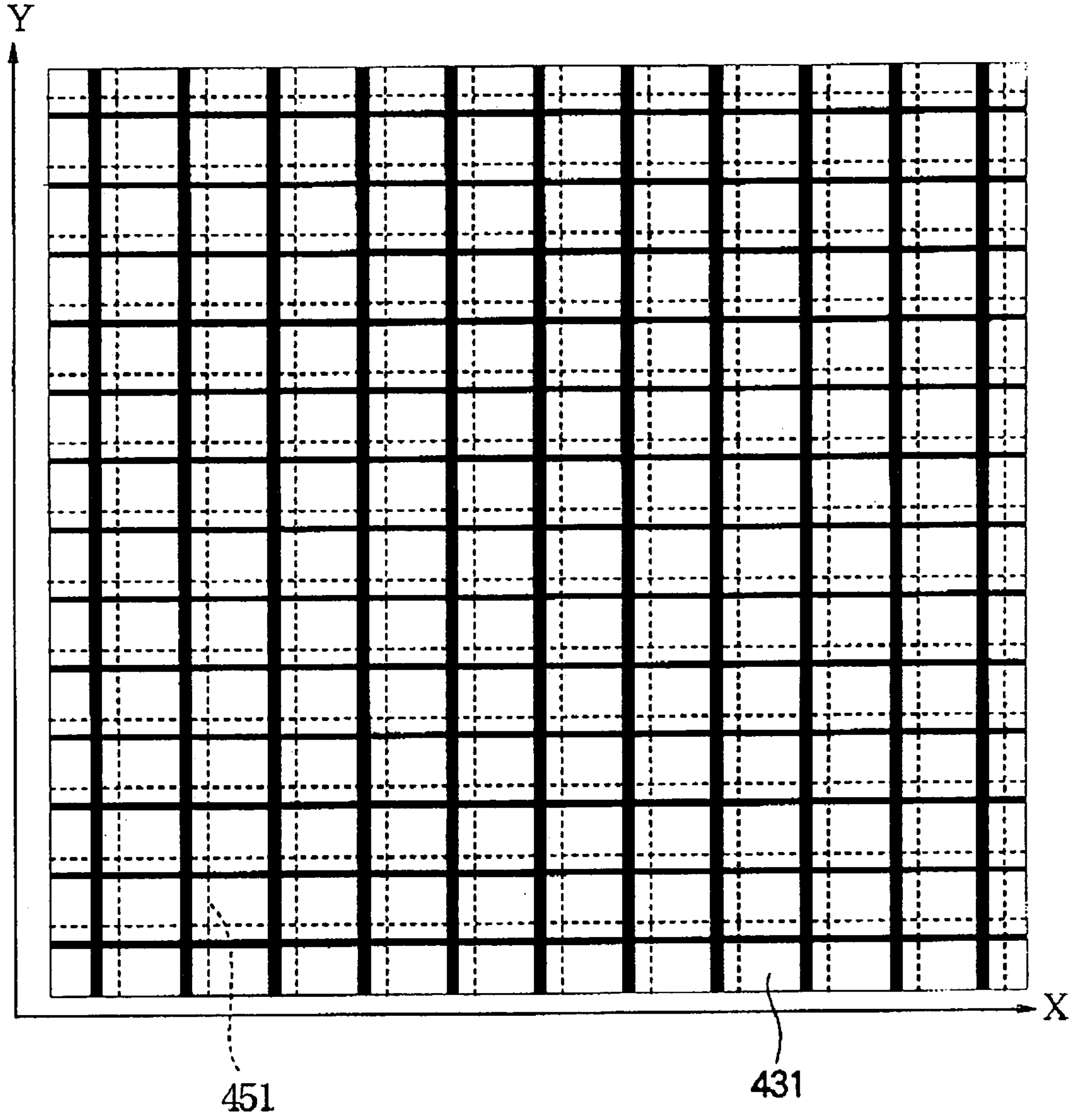
FIG. 12 shows an example of a display screen obtained as a result of determination of values of X2, Y2, and θ that minimize SAD indicating the sum of absolute values of differences.

After completion of the calibration process using the cross hatch pattern, the display unit 211 displays the cross hatch image on the observing display 18A, as shown in FIG. 12, according to X2, Y2, and θ determined, in the calibration process, such that SAD has a minimum value. In FIG. 12, similar parts to those in FIG. 11 are denoted by similar reference numerals, and a duplicated explanation thereof is omitted herein.

In FIG. 12, in addition to the cross hatch image on the captured image shown in FIG. 11, an image of a cross hatch pattern obtained as the result of the calibration performed so as to minimize the value of SAD is also shown. One block 451 defined by vertical and horizontal broken lines has a X-directional size X2 and a Y-directional size Y2. The X-directional size X2 of the block 451 is equal to the X-directional size of one cross hatch block 431, and the Y-directional size Y2 of the block 451 is equal to the Y-directional size of one cross hatch block 431. This means that the X-directional size and the Y-directional size of the cross hatch block 431 have been determined precisely. X-directional sides of the block 451 represented by broken lines are parallel to X-directional sides of the cross hatch block 431. This means that the tilt angle θ has also been determined precisely.

This can be accomplished because the cross hatch image has a large difference in luminance between the block 431 and cross hatch lines so that the vertex of the cross hatch block 431 can be easily detected, and thus the X-directional size and the Y-directional size of the cross hatch block 431 and the tilt angle θ can be determined precisely.

As described above, the data processing apparatus 18 determines the tilt angle θ and the size (pitch) (X2 and Y2) of one cross hatch block 431 on the captured image, from the cross hatch image captured by the camera. Furthermore, based on the size (X2 and Y2) of the block 431, the data processing apparatus 18 determines the size (Xd and Yd) of the captured pixel image (the pixel of the display 11 under evaluation) on the captured image.

As described above, by determining the tilt angle θ and the size (X2 and Y2) of one cross hatch block 431 on the captured image of the cross hatch pattern, and then determining the size (Xd, and Yd) of the captured pixel image on the captured image based on the size (X2 and Y2) of the block 431, the data processing apparatus 18 can identify the position and the size of each captured pixel image on the captured image and can evaluate the characteristic of each pixel of the display 11 under evaluation. Thus, it is possible to quickly and precisely measure and evaluate the characteristic of the display 11 under evaluation.

In this technique, the size (X2 and Y2) of one cross hatch block 431 is determined, and then the size of one captured pixel image on the captured image is determined based on the size (X2 and Y2) of the block 431, and thus the correction of the tilt angle θ of the captured image taken by the high-speed camera 12 with respect to the axis of the pixel array of the display screen of the display 11 under evaluation is made using the captured image with a lower zooming ratio than is needed when the size of one captured pixel image is directly determined.

That is, when the size of one captured pixel image is directly determined, it is required that the high-speed camera 12 should take an image of the display screen (more strictly, an image displayed on the display screen) of the display 11 under evaluation with a sufficiently large zooming ratio so that the size of the one pixel of the display 11 under evaluation on the captured image displayed on the screen of the observing display 18A is large enough to detect the pixel. On the other hand, in the case in which the size of the captured pixel image is determined indirectly using the cross hatch image, it is sufficient if the high-speed camera 12 takes an image of the cross hatch pattern displayed on the display screen of the display 11 under evaluation with a zooming ratio so that when the captured image of the cross hatch pattern displayed on the display 11 under evaluation is displayed on the display screen of the observing display 18A, the size of each cross hatch block is large enough to detect the cross hatch block. Thus, the correction of the tilt angle θ of the captured image taken by the high-speed camera 12 with respect to the axis of the pixel array of the display screen of the display 11 under evaluation can be made using the captured image with a lower zooming ratio than is needed when the size of one captured pixel image is directly determined.

Next, referring to a flow chart shown in FIG. 13, a process performed by the data processing apparatus 18 to measure the response characteristic of one pixel of a LCD display screen of the display 11 under evaluation is described below. This process is performed after the calibration process described above with reference to FIG. 6 or 9 is completed.

In step S51, the display unit 311 displays a IUE on the display 11 under evaluation (LCD). More specifically, the display unit 311 controls the video signal generator 15 to generate a video signal for displaying the IUE and supply the generated video signal to the display 11 under evaluation. Based on the video signal supplied from the video signal generator 15, the display 11 under evaluation (LCD) displays the IUE on the display screen of the display 11 under evaluation.

For example, the IUE displayed on the display 11 under evaluation may be such an image that is equal in pixel value (for example, luminance) for all pixels of the display screen of the display 11 under evaluation over one entire field and that varies in pixel value from one field to another.

If the operator issues a command to take an image of the IUE by operating the data processing apparatus 18, an input signal indicating the command to take an image of the IUE is supplied from the input unit 315 to the image pickup unit 312. In step S52, the image pickup unit 312 takes an image of the IUE displayed on the display 11 under evaluation (LCD) via the high-speed camera 12. More specifically, in step S52, in response to the input signal from the input unit 315, the image pickup unit 312 controls the controller 17 so that the high-speed camera 12 takes an image of the displayed IUE. Under the control of the controller 17, the high-speed camera 12 takes an image of the IUE displayed on the display 11 under evaluation in synchronization with the synchronization signal supplied from the synchronization signal generator 16.

In this process, for example, the high-speed camera 12 takes an image of the IUE displayed on the display 11 under evaluation with a zooming ratio that allows each pixel of the display 11 under evaluation to have a size large enough for detection on display screen of the observing display 18A at a capture rate of 6000 frames/sec. Note that the high-speed camera 12 maintained at the position where the calibration process was performed.

In the above process, the enlarging unit 314 controls the zoom ratio of the high-speed camera 12 via the controller 17 such that when the captured test image displayed on the display 11 under evaluation is displayed on the observing display 18A, the pixels of the test image displayed on the observing display 18A have a size large enough to recognize. The resultant captured image data obtained by taking an image of the test image displayed on the display 11 under evaluation by using the high-speed camera 12 and enlarging the captured image is supplied from the high-speed camera 12 to the data processing apparatus 18 via the controller 17. The display unit 311 transfers the captured image data supplied from the enlarging unit 314 to the observing display 18A, which displays the enlarged test image in accordance with the received captured image data.

If the operator operates the data processing apparatus 18 to specify one of captured pixel images of the display 11 under evaluation on the captured image displayed on the observing display 18A, an input signal indicating the captured pixel image specified by the operator is supplied from the input unit 315 to the selector 313. In step S53, in accordance with the input signal from the input unit 315, the selector 313 selects the captured pixel image specified by the operator from the captured pixel images on the captured image of the display 11 under evaluation (LCD) displayed on the observing display 18A.

Figure 14:
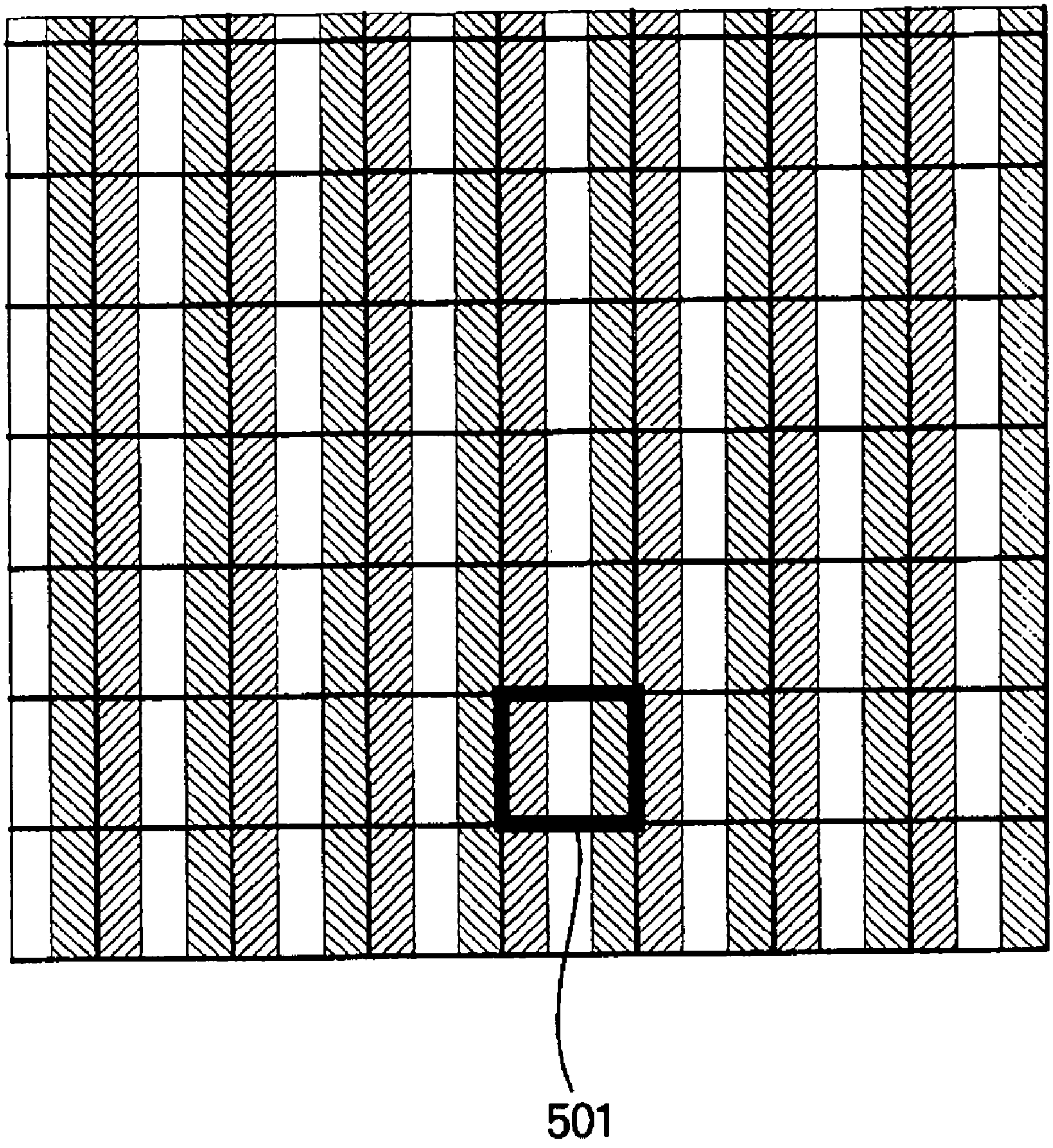
FIG. 14 shows an example of a screen on which a captured image of pixels of a display under evaluation is displayed.

Thus, the captured image is displayed on the observing display 18A, for example, in such a manner as shown in FIG. 14. In FIG. 14, a rectangle hatched with lines sloping upwards from left to right denotes an area where red light is emitted on the display screen of the display 11 under evaluation. A rectangular area with no hatching lines denotes an area in which green light is emitted. A rectangle hatched with lines sloping downwards from left to right denotes an area where blue light is emitted. In FIG. 14, rectangular areas hatched with lines sloping upwards from left to right, rectangular areas with no hatching lines, and rectangular areas hatched with lines sloping downwards from left to right are arranged one by one in the horizontal direction. Each rectangle including a rectangular area hatched with lines sloping upwards from left to right, a rectangular area with no hatching lines, and a rectangular area hatched with lines sloping downwards from left to right denotes one captured pixel image (one pixel of the display 11 under evaluation).

On the display screen of the observing display 18A, in addition to a captured image of pixels (captured pixel images) of the display 11 under evaluation, a cursor 501 for selecting a captured pixel image is displayed. The cursor 501 is displayed in such a manner that the cursor 501 surrounds one captured pixel image. If the operator moves the cursor 501 to a desired pixel (captured pixel image) on the display screen of the observing display 18A by operating the data processing apparatus 18, the pixel (captured pixel image) surrounded by the cursor 501 is selected from pixels of the display 11 under evaluation displayed on the observing display 18A.

Figure 13:
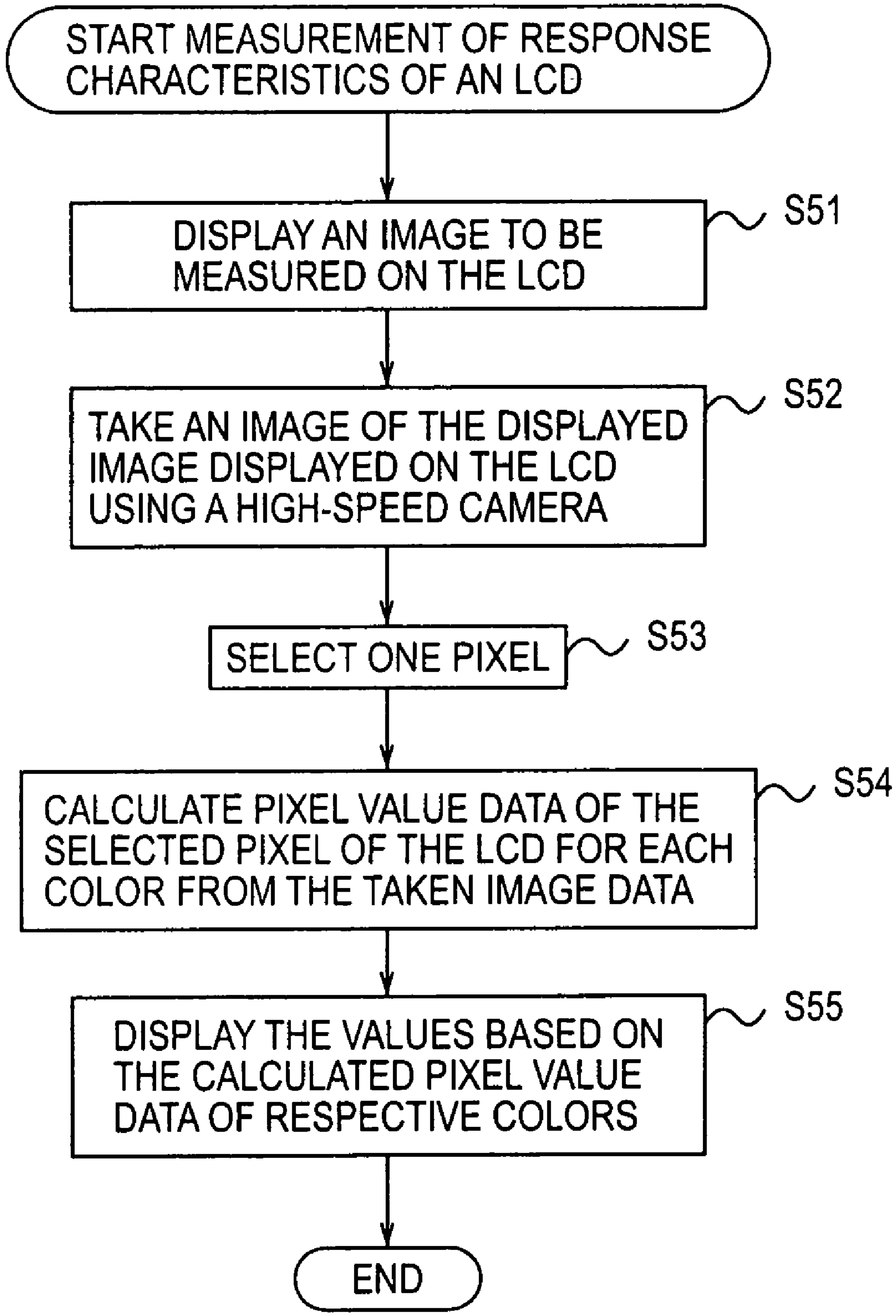
FIG. 13 is a flow chart showing a process of measuring a response characteristic of a LCD.

Referring again to the flow chart shown in FIG. 13, In step S54, the calculation unit 316 calculates the pixel value of each color of the pixel, selected by the selector 313, of the display 11 under evaluation (LCD).

For example, if the coordinates of the lower left vertex of the captured pixel image selected by the selector 313 are represented as (XB', YB') in the coordinate system defined on the captured image such that the lower left vertex of the reference block 401 (FIG. 7) is employed as the origin and two axes are defined so as to extend parallel to the X and Y directions, the calculation unit 316 calculates equations (10), (11), and (12) using the equation (obtained by substituting X2, Y2, and θ, which cause SAD to have a minimum value, into equations (5) and (6)) defining the conversion of the captured image data to the pixel data of the display 11 under evaluation thereby determining the red (R) component Pr, the green (G) component Pg, and the blue (B) component Pb of the pixel value of the selected pixel of the display 11 under evaluation, and thus determining the pixel value of the selected pixel of the display 11 under evaluation (LCD) for each color.

$$Pr = \sum_{i=0}^{X2} \sum_{j=0}^{Y2} lr(XB' + i, YB' + j) / (x2 \times Y2) \tag{10}$$

$$Pg = \sum_{i=0}^{X2} \sum_{j=0}^{Y2} lg(XB' + i, YB' + j) / (x2 \times Y2) \tag{11}$$

$$Pg = \sum_{i=0}^{X2} \sum_{j=0}^{Y2} lb(XB' + i, YB' + j) / (x2 \times Y2) \tag{12}$$

In equation (10), lr(XB'+i, YB'+j) denotes the red (R) component of the pixel value of a pixel of the observing display 18A, at a position (XB'+i, YB'+j) on the captured image. In equation (10), Σ on the left-hand position indicates that lr(XB'+i, YB'+j)/(X2×Y2) should be added together for i=0 to X2, and Σ on the right-hand position indicates that lr(XB'+i, YB'+j)/(X2×Y2) should be added together for j=0 to Y2.

Similarly, in equation (11), lg(XB'+i, YB'+j) denotes the green (G) component of the pixel value of the pixel of the observing display 18A, at a position (XB'+i, YB'+j) on the captured image. In equation (11), Σ on the left-hand position indicates that lg(XB'+i, YB'+j)/(X2×Y2) should be added together for i=0 to X2, and Σ on the right-hand position indicates that lg(XB'+i, YB'+j)/(X2×Y2) should be added together for j=0 to Y2.

In equation (12), lb(XB'+i, YB'+j) denotes the blue (B) component of the pixel value of the pixel of the observing display 18A, at a position (XB'+i, YB'+j) on the captured image. In equation (12), Σ on the left-hand position indicates that lb(XB'+i, YB'+j)/(X2×Y2) should be added together for i=0 to X2, As described above, the calculation unit 316 calculates the pixel values of respective colors of the pixel, selected by the selector 313, of the display 11 under evaluation from the captured image data in accordance with equations (10), (11), and (12). Note that the calculation unit 316 calculates the pixel value of each color of the selected pixel of the display 11 under evaluation for all captured image data supplied from the high-speed camera 12. The calculation unit 316 calculates the pixel value of each color of the selected pixel of the display 11 under evaluation for captured image data taken by the high-speed camera 12 at a plurality of points of times at intervals corresponding field (frame) periods and supplied from the high-speed camera 12.

In step S55, the display unit 311 displays values of pixels of respective colors on the observing display 18A in accordance with the calculated pixel values for respective colors. As a result, the image with the pixel value is displayed on the observing display 18A, whereby the response characteristic of the display 11 under evaluation (LCD) is displayed, for example, as shown in FIG. 15.

Figure 15:
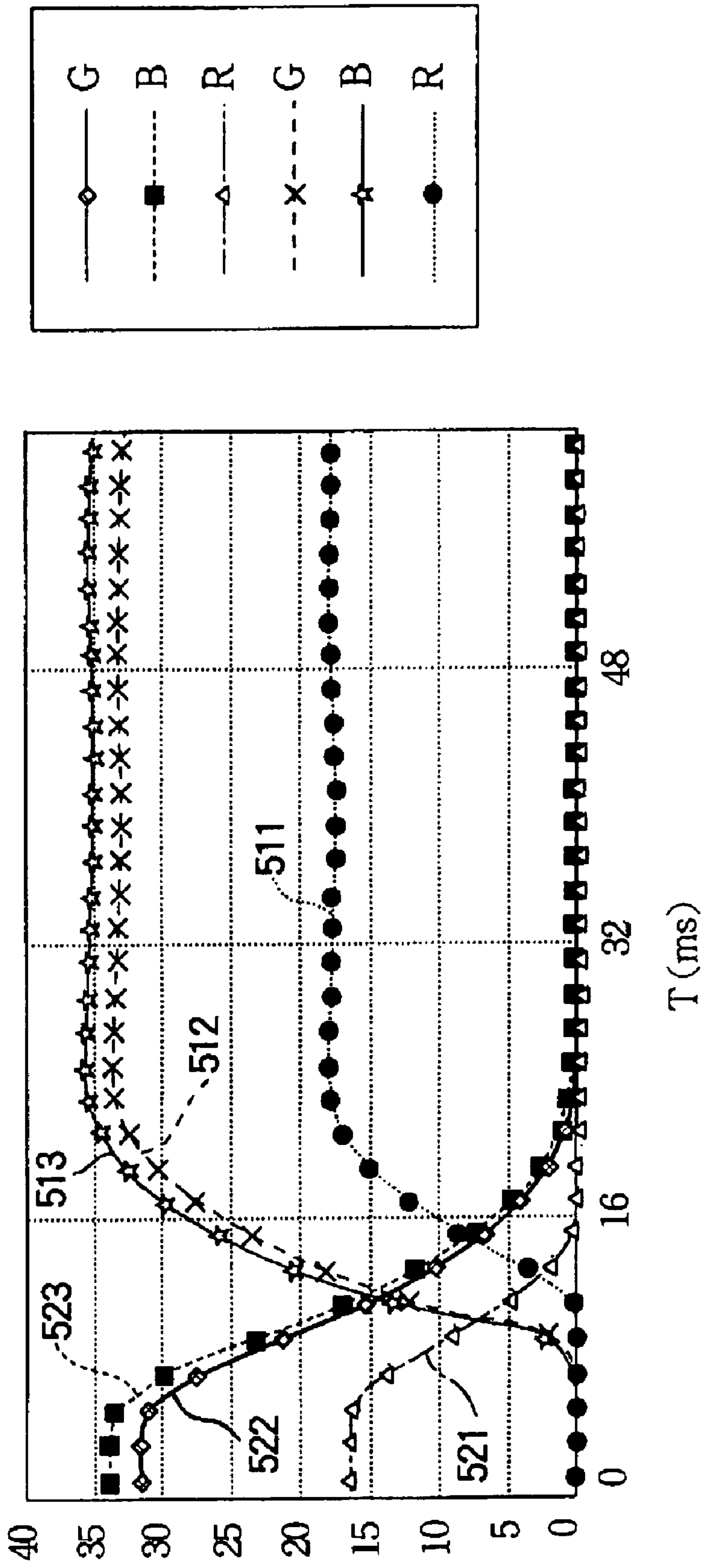
FIG. 15 is a diagram showing a response characteristic of a LCD.

In FIG. 15, the horizontal axis indicates time, and the vertical axis indicates the pixel value of a particular color (R, G, or B) for a pixel of the display 11 under evaluation. In this example, the high-speed camera 12 takes the image 8 times in each period of 16 msec. In FIG. 15, curves 511 to 513 respectively represent changes in pixel values of R, G, and B with time that occur when the pixel value of a pixel is switched from 0 to a particular value.

The values of curves 511 to 513 remain at 0 during a period of 8 msec after the pixel value is switched from 0 to the particular value. After this period, the values of curves 511 to 513 gradually increase. At 24 msec, values to be output are reached, and these values are maintained thereafter. From FIG. 15, it can be seen that the R component changes at a lower speed than G and B components.

Curves 521 to 523 respectively represent changes in pixel values of R, G, and B with time that occur when the pixel value of a pixel is switched from a particular value to 0.

The values of curves 521 to 523 remain unchanged during a period of 6 msec after the pixel value is switched from the particular value to 0. After this period, the values of curves 521 to 523 gradually decrease until 0 is reached at 16 msec or 24 msec. From FIG. 15, it can be seen that the R component changes at a lower speed than G and B components.

As described above, in accordance with the equation which is determined in the calibration process so as to define the conversion from the captured image data to the pixel data of the display 11 under evaluation, the data processing apparatus 18 calculates the pixel value of each color of the pixel of the display 11 under evaluation (LCD).

By calculating the pixel value of each color for respective pixels of the display 11 under evaluation in the above-described manner, it is possible to measure the time response characteristic of the respective pixels of the display 11 under evaluation for a short period whereby it is possible to evaluate the time response characteristic thereof. Thus, it is possible to quickly and precisely measure and evaluate the characteristic of the display 11 under evaluation. Furthermore, by calculating the pixel value of each color for respective pixels of the display 11 under evaluation in the above-described manner, it is possible to evaluate the variation in luminance among pixels in a particular area. Thus, it is possible to evaluate whether the display 11 under evaluation emits light exactly as designed, for each pixel of the display 11 under evaluation.

Furthermore, using the equation defining the conversion from the captured image data to the pixel data of the display 11 under evaluation, it is possible to determine the luminance at an arbitrary point in a pixel of the display 11 under evaluation on the captured image on the display screen of the observing display 18A (note that the luminance at that point is actually given by emission of light from a corresponding pixel of the observing display 18A), and thus it is possible to evaluate the variation in luminance among pixels of the display 11 under evaluation on the display screen of the observing display 18A.

By taking a plurality of images of the display screen (more strictly, an image displayed on the display screen) of the display 11 under evaluation during a period in which the display 11 under evaluation displays one field (one frame) of image, it is possible to measure and evaluate the time response characteristic of each pixel of the display 11 under evaluation in a shorter time.

For example, when a PDP placed as the display 11 under evaluation on the stage 14 displays an image at a rate of 60 fields/sec, if an image of the image displayed on the PDP at a rate of 500 frames/sec is taken using the high-speed camera 12, it is possible to measure and evaluate the characteristic for each subfield of the image displayed on the PDP.

Figure 16:
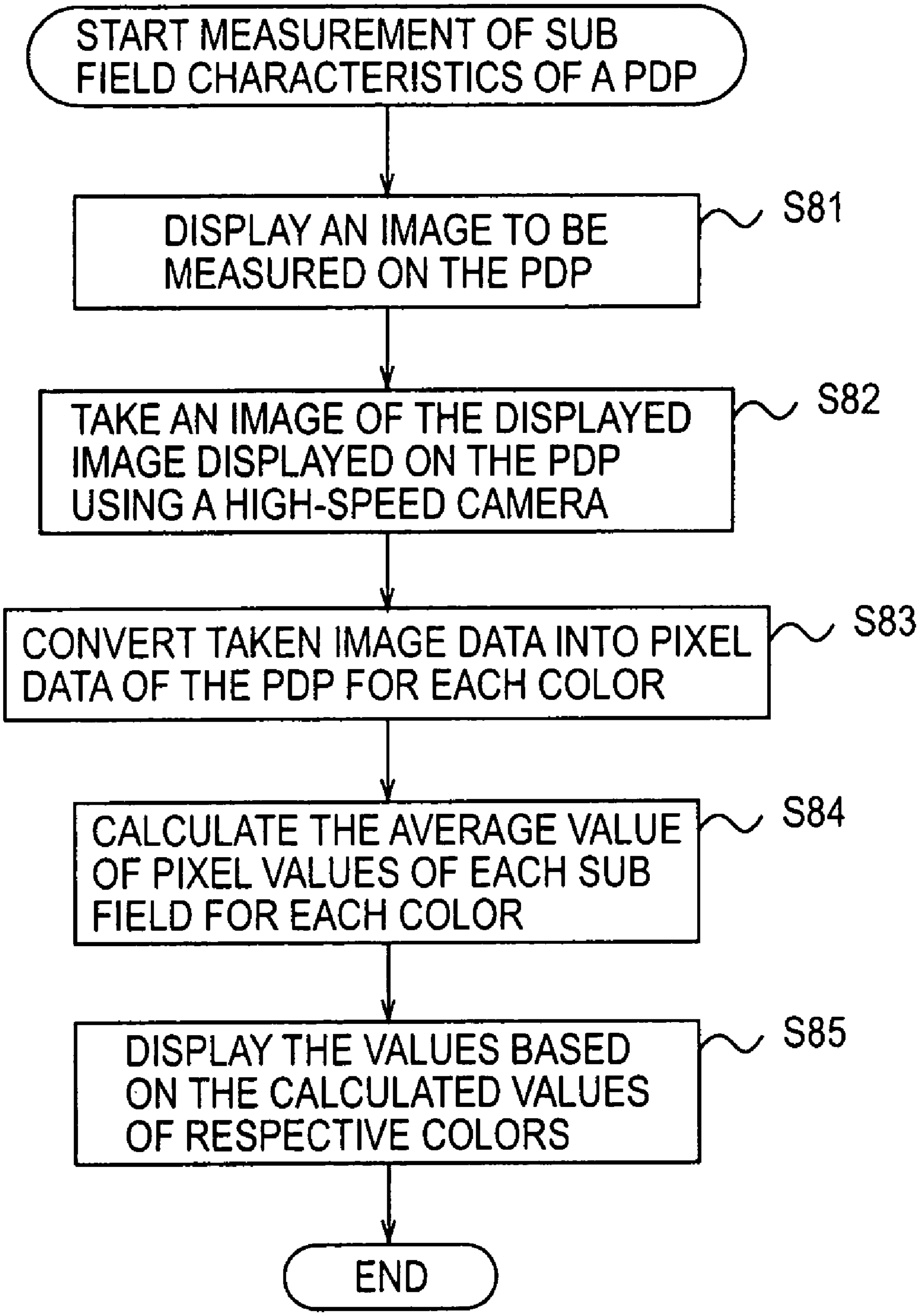
FIG. 16 is a flow chart showing a process of measuring a subfield characteristic of a PDP.

Now, referring to a flow chart shown in FIG. 16, a process performed by the data processing apparatus 18 to measure the characteristic of a subfield of an image displayed on the PDP under evaluation is described below.

In step S81, the display unit 311 displays a IUE on the display 11 under evaluation (PDP). More specifically, the display unit 311 controls the video signal generator 15 to generate a video signal for displaying the IUE and supply the generated video signal to the display 11 under evaluation. Based on the video signal supplied from the video signal generator 15, the display 11 under evaluation (PDP) displays the IUE on the display screen of the display 11 under evaluation at a rate of 60 fields/sec.

If the operator issues a command to take an image of the IUE by operating the data processing apparatus 18, an input signal indicating the command to take an image of the IUE is supplied from the input unit 315 to the image pickup unit 312. In step S82, the image pickup unit 312 takes an image of the IUE displayed on the display 11 under evaluation (PDP) via the high-speed camera 12. More specifically, in step S82, in accordance with the input signal from the input unit 315, the image pickup unit 312 controls the controller 17 so that the high-speed camera 12 takes an image of the displayed IUE. Under the control of the controller 17, the high-speed camera 12 takes an image of the IUE displayed on the display 11 under evaluation (PDP) in synchronization with the synchronization signal supplied from the synchronization signal generator 16, and the high-speed camera 12 supplies obtained image data to a data processing apparatus 18 via the controller 17.

For example, the high-speed camera 12 takes an image of the IUE displayed on the display 11 under evaluation (PDP) at a rate of 500 frames/sec. Note that the high-speed camera 12 maintained at the position where the calibration process was performed.

Figure 17:
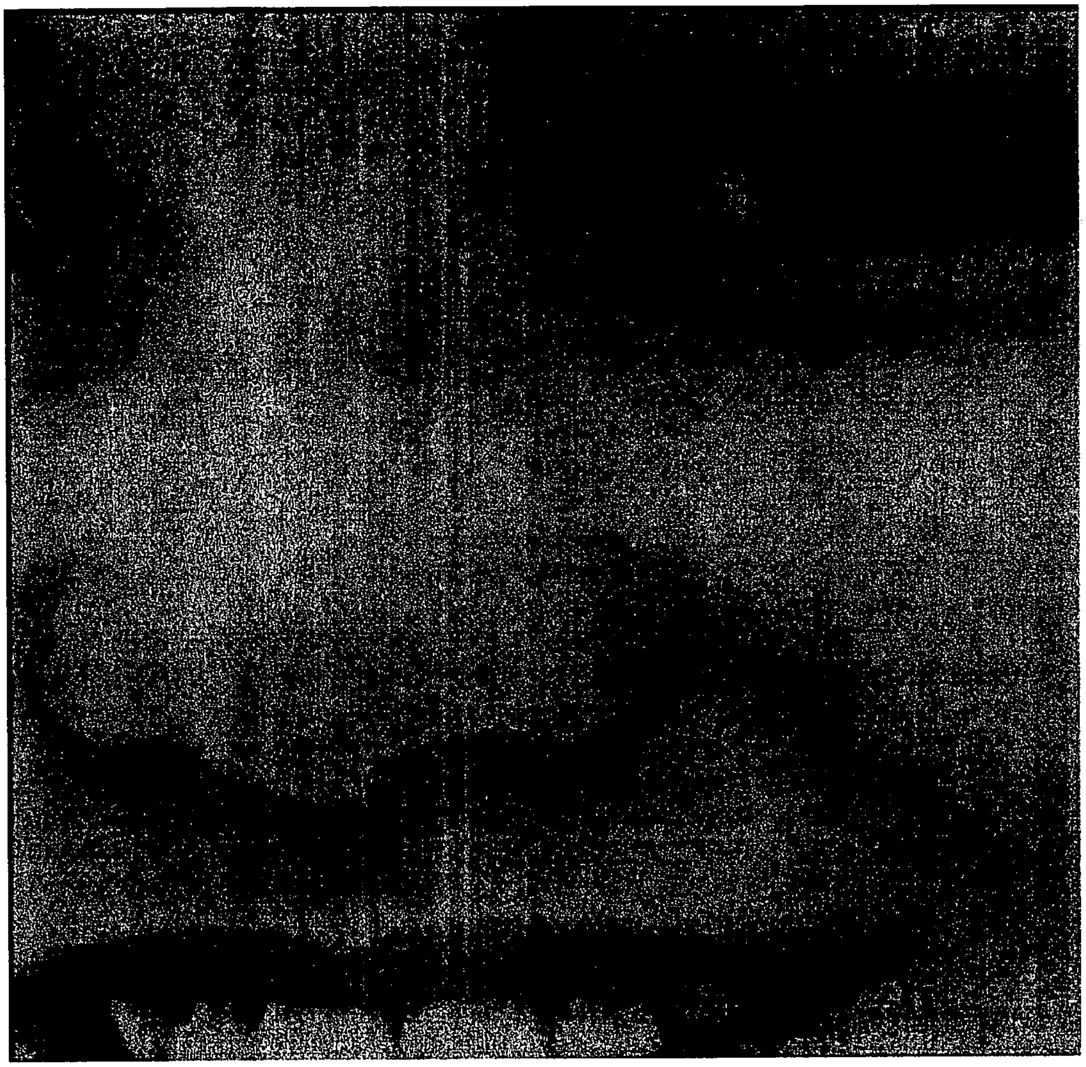
FIG. 17 shows an example of a captured image of a screen of a display under evaluation.

For example, when the display 11 under evaluation displays a IUE (such as an image of a human face) with a subfield period of 1/500 sec and a field period of 1/60 sec, if an image of the IUE displayed on the display 11 under evaluation is taken by the high-speed camera 12 at a rate of 60 frames/sec in synchronization with displaying of the field image, an image such as that shown in FIG. 17 is displayed as a captured image on the observing display 18A.

In the example shown in FIG. 17, an image of a human face is displayed as the captured image. Because the high-speed camera 12 takes one frame of image of the image displayed on the display 11 under evaluation in a time (exposure time) equal to a period during which one field of image is displayed, the resultant image obtained as the captured image represents one field of image which would be perceived by human eyes when the display 11 under evaluation is viewed.

Figure 18:
FIG. 18 shows an example of a captured image of a screen of a display under evaluation.

On the other hand, when the same image as that shown in FIG. 17 is displayed on the display 11 under evaluation at a rate of 60 fields/sec, if an image of the this image displayed on the display 11 under evaluation is taken by the high-speed camera 12 at a rate of 500 frames/sec in synchronization with displaying of the subfield image, an image such as that shown in FIG. 18 is displayed as a captured image on the observing display 18A.

In the example shown in FIG. 18, an image that seems to be a human face is displayed as the captured image. Because the high-speed camera 12 takes one frame of image of the image displayed on the display 11 under evaluation in a time (exposure time) equal to a period during which one subfield of image is displayed, the resultant image obtained as the captured image is an image of one subfield of image displayed on the display 11 under evaluation. Thus, by taking an image of an image displayed on the display 11 under evaluation, at a rate of, for example, 500 frames/sec, it is possible to obtain a captured image of a displayed subfield image, which cannot be perceived by human eyes when the display 11 under evaluation is viewed. Based on this captured image, it is possible to analyze the details of the characteristic of the display 11 under evaluation.

Referring again to FIG. 16, if the high-speed camera 12 takes an image of the displayed image on the display 11 under evaluation and the high-speed camera 12 supplies the resultant captured image data to the data processing apparatus 18, then in step S83, the conversion unit 317 converts the captured image data supplied from the high-speed camera 12 into pixel data of each color of pixels of the display 11 under evaluation (PDP).

More specifically, the conversion unit 317 calculates equations (10), (11), and (12) using the equation (obtained by substituting X2, Y2, and θ, for which SAD has a minimum value, into equations (5) and (6)) defining the conversion of the captured image data to the pixel data of the display 11 under evaluation thereby determining the R value Pr, the G value Pg, and B value Pb for one pixel of the display 11 under evaluation on the captured image. By determining the R value Pr, the G value Pg, and B value Pb in a similar manner for all pixels of the display 11 under evaluation on the captured image, the captured image data is converted into pixel data of respective colors of pixels of the display 11 under evaluation (PDP). The conversion unit 317 performs the process described above for all captured image data supplied from the high-speed camera 12 thereby converting all captured image data supplied from the high-speed camera 12 into data of respective pixels of the display 11 under evaluation (PDP) for respective colors.

In step S84, based on the pixel data of respective colors of the display 11 under evaluation obtained by the conversion of the captured image data, the calculation unit 316 calculates the average value of each screen (each subfield image) of the display 11 under evaluation for each color.

More specifically, for example, the calculation unit 316 extracts R values of respective pixels of one subfield from the pixel data of each color of the display 11 under evaluation and calculates the average of the extracted R values. Similarly, the calculation unit 316 extracts G and B values of respective pixels of that subfield and calculates the average value of G values and the average value of B values.

The average value of R values, the average value of G values, and the average value of B values of pixels are calculated in a similar manner for each of following subfields one by one, thereby determining the average value of each color of each captured image for all pixels of the display 11 under evaluation.

In step S85, the display unit 311 displays the determined values of respective colors on the observing display 18A. Thus, the process is complete.

Figure 19:
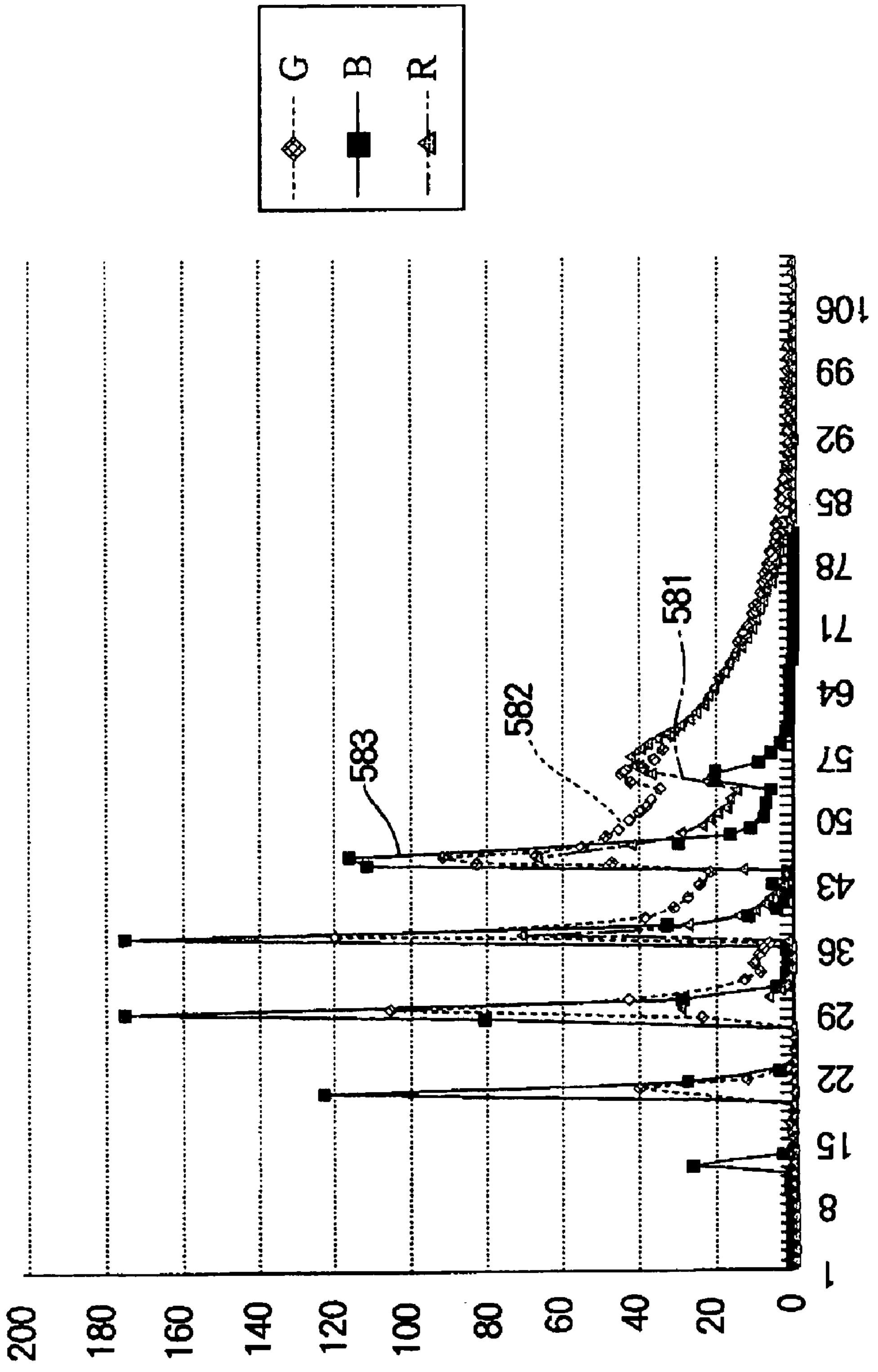
FIG. 19 illustrates a subfield characteristic of a PDP.

FIG. 19 shows an example of the result displayed on the observing display 18A. In this example, values are displayed in accordance with the obtained data of respective colors.

In this figure, the horizontal axis indicates the order in which captured images (images of subfields) were shot, and the vertical axis indicates the average value of R values, the average value of G values, and the average value of B values of pixels of the display 11 under evaluation for one subfield. Curves 581 to 583 respectively represent the average value of R values, the average value of G values, and the average value of B values of pixels of the display 11 under evaluation for each subfield.

In FIG. 19, the curves 581 to 583 have a value of 0 for first to eleventh subfield images. This means that no image was displayed in these subfields on the display 11 under evaluation. For 15th to 50th subfields, the curve 583 indicating the B value is higher in value than the curves 581 and 582 respectively indicating R and G values. This means that images were generally bluish in these subfields. For 57th to 71st subfields, the curve 583 indicating the B value is lower in value than the curves 581 and 582 respectively indicating R and G values. This means that images were generally yellowish in these subfields.

As described above, the data processing apparatus 18 converts the captured image data into data of respective pixels of the display 11 under evaluation (PDP) in accordance with the equation that is determined in the calibration process and that defines the conversion from the captured image data into pixel data of the display 11 under evaluation.

It is possible to measure and evaluate the characteristics of the display 11 under evaluation (PDP) on a subfield-by-subfield basis, by taking an image of a subfield image displayed on the display 11 under evaluation in synchronization with displaying of the subfield image and converting the obtained captured image data into data of respective pixels of the display 11 under evaluation.

When a human user watches a moving object displayed on a display screen, eyes of the human user follow the displayed moving object and the image of the moving object displayed on a LCD has a blur perceived by human eyes. In the case of a PDP, when a moving object displayed on the PDP is viewed by human eyes, a blur of color perceivable by human eyes occurs in the image of the moving object displayed on the PDP because of light emission characteristics of phosphors.

The data processing apparatus 18 is capable of determining a bur due to motion or a blue in color perceived by human eyes based on the captured image data and displaying the result. Now, referring to a flow chart shown in FIG. 20, a process performed by the data processing apparatus 18 to analyze a blur in an image due to motion based on captured image data and displaying values of respective captured pixel images of the image is described below.

In step S101, the display unit 311 displays a IUE on the display 11 under evaluation. More specifically, the display unit 311 controls the video signal generator 15 to generate a video signal for displaying the IUE and supply the generated video signal to the display 11 under evaluation. Based on the video signal supplied from the video signal generator 15, the display 11 under evaluation displays the IUE on the display screen of the display 11 under evaluation. More specifically, for example, of a series of field images with a field frequency of 60 Hz of an object moving in a particular direction on the display screen of the display 11 under evaluation, one field of image is displayed as the IUE.

If the operator issues a command to take an image of the IUE by operating the data processing apparatus 18, an input signal indicating the command to take an image of the IUE is supplied from the input unit 315 to the image pickup unit 312. In step S102, the image pickup unit 312 takes an image of the IUE displayed on the display 11 under evaluation by using the high-speed camera 12. More specifically, in step S102, in accordance with the input signal from the input unit 315, the image pickup unit 312 controls the controller 17 so that the high-speed camera 12 takes an image of the displayed IUE. Under the control of the controller 17, the high-speed camera 12 to take an image of the IUE displayed on the display 11 under evaluation and supplies obtained image data to a data processing apparatus 18 via the controller 17.

For example, in step S102, the high-speed camera 12 takes an image of the IUE displayed on the display 11 under evaluation at a rate of 600 frames/sec. Note that the high-speed camera 12 maintained at the position where the calibration process was performed.

In step S103, the conversion unit 317 converts the captured image data supplied from the high-speed camera 12 into data of respective pixels of the display 11 under evaluation.

More specifically, the conversion unit 317 calculates equations (10), (11), and (12) using the equation (obtained by substituting X2, Y2, and θ, for which SAD has a minimum value, into equations (5) and (6)) defining the conversion of the captured image data to the pixel data of the display 11 under evaluation thereby determining the R value Pr, the G value Pg, and B value Pb for one pixel of the display 11 under evaluation on the captured image. For this pixel of the display 11 under evaluation, the conversion unit 317 then determines the luminance from the R value Pr, the G value Pg, and B value Pb of that pixel in accordance with equation (13) shown below.

$$Ey=(0.3\times Pr)+(0.59\times Pg)+(0.11\times Pb) \quad (13)$$

where Ey is the luminance of a pixel of the display 11 under evaluation determined from the R value Pr, the G value Pg, and B value Pb of that pixel. The conversion unit 317 determines the luminance Ey in a similar manner for all pixels of the display 11 under evaluation on the captured image thereby converting the captured image data supplied from the high-speed camera 12 into data indicating the luminance for each pixel of the display 11 under evaluation. In the above process, the conversion unit 317 performs the above-described calculation for all captured image data supplied from the high-speed camera 12 to convert the captured image data supplied from the high-speed camera 12 into data indicating the luminance of each pixel of the display 11 under evaluation.

In step S104, the calculation unit 316 calculates amounts of motion vx and vy per field of a moving object displayed on the display 11 under evaluation, where vx and vy respectively indicate the amounts of motion in X and Y directions represented in the coordinate system defined on the captured image such that the lower left vertex of the reference block 401 (FIG. 7) is employed as the origin and two axes are defined so as to extend parallel to the X and Y directions. More specifically, the calculation unit 316 determines the values of vx and vy indicating the amounts of motion of the moving object from X2, Y2, and θ, for which SAD has a minimum value, according to equations (14) and (15) shown below.

$$vx=(Vx\times X2)+(Vy\times Y2\times\theta/(Ly/2)) \quad (14)$$

$$vy=(Vy\times Y2)+(Vx\times X2\theta/(Lx/2)) \quad (15)$$

where Vx and Vy respectively indicate the amounts of motion in X and Y directions per field on the input image (IUE) displayed on the display 11 under evaluation, and Lx and Ly respectively indicate the size in the X direction and the size in the Y direction of the captured image.

In step S105, the normalization unit 318 normalizes the pixel value of the moving object displayed on the display 11 under evaluation for each frame.

Figure 21:
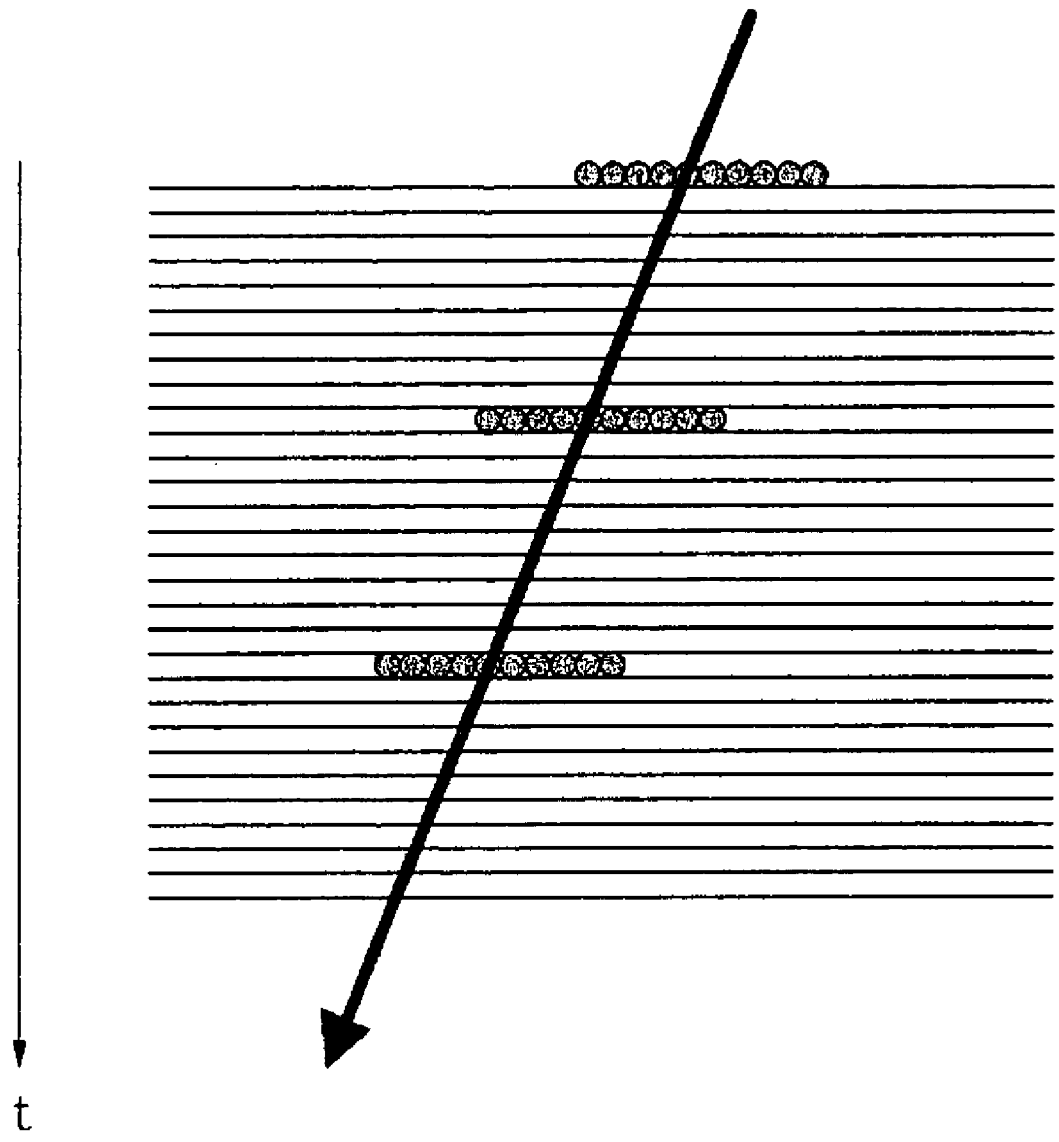
FIG. 21 is a diagram illustrating movement of a moving object displayed on a display under evaluation.

For example, when a IUE is displayed on a display screen of a CRT placed as the display 11 under evaluation on the stage 14, an object moves on the captured image, for example, in such a manner as shown in FIG. 21.

In FIG. 21, the vertical axis indicates time elapsing from up to down in the figure, and each horizontal line indicates one captured image taken at a point of time. Circles on each captured image indicate pixels (of the observing display 18A) that represent the moving object on the captured image. In FIG. 21, an arrow pointing from upper right to lower left indicates a change in the position of the moving object on the captured image with time.

The CRT displays an image by scanning an electron beam emitted from a built-in electron gun along a plurality of horizontal (scanning) lines over a display screen, and thus each pixel displays the image for only a very short time that is a small fraction of one field. In the example shown in FIG. 21, ten shots are taken in a period in which one field of image is displayed on the screen of the display 11 under evaluation. Of these ten shots, the first shot (the captured image at the top in FIG. 21) includes the image of the moving object. However, second to tenth shots do not include the image of the moving object.

Herein, let us assume that the moving object displayed on the display 11 under evaluation moves at a constant speed in the coordinate system defined such that the lower left vertex of the reference block 401 (FIG. 7) is employed as the origin and two axes are defined so as to extend parallel to the X and Y directions. Let vx denote the amount of motion of the moving object in the X direction per field, and vy the amount of motion in the Y direction. Let fd denote the field frequency of the display 11 under evaluation, and let fz denote the number of frames per second taken by the high-speed camera 12. Furthermore, let Vzx denote the amount of motion per frame of the moving object in the X direction, and let Vzy denote the amount of motion per frame in the Y direction, then Vzx and Vzy are respectively given by equations (16) and (17) shown below.

$$Vzx=vx\times fd/fz \quad (16)$$

$$Vzy=vy\times fd/fz \quad (17)$$

That is, the amount, Vzx, of the motion per frame of the moving object in the X direction is given by calculating the amount of motion per second of the moving object in the X direction by multiplies the amount, vx, of motion per field in the X direction by the field frequency fd of the display 11 under evaluation and then diving the result by the number, fz, of frames per second taken by the high-speed camera 12. Similarly, the amount, Vzy, of the motion per frame of the moving object in the Y direction is given by calculating the amount of motion per second of the moving object in the Y direction by multiplies the amount, vy, of motion per field in the Y direction by the field frequency fd of the display 11 under evaluation and then diving the result by the number, fz, of frames per second taken by the high-speed camera 12.

Herein, let us denote the first image taken by the high-speed camera 12 simply as the first captured image, and the q-th image taken by the high-speed camera 12 simply as the q-th captured image. The normalization unit 318 normalizes the pixel values such that the q-th captured image is shifted by qVzx in the X direction and by qvzy in the Y direction for all q values, resultant pixel values (for example, luminance) at each pixel position are added together for all captured images from the first captured image to the last captured image, and finally the normalized value is determined such that the maximum pixel value becomes equal to 255 (more specifically, when original pixel values are within the range from 0 to 255, the normalized pixel value is obtained by calculating the sum of pixel values and then dividing the resultant sum by the number of pixels). That is, the normalization unit 318 spatially shifts respective captured images in the direction in which the moving object moves and superimposes the resultant captured images.

Figure 22:
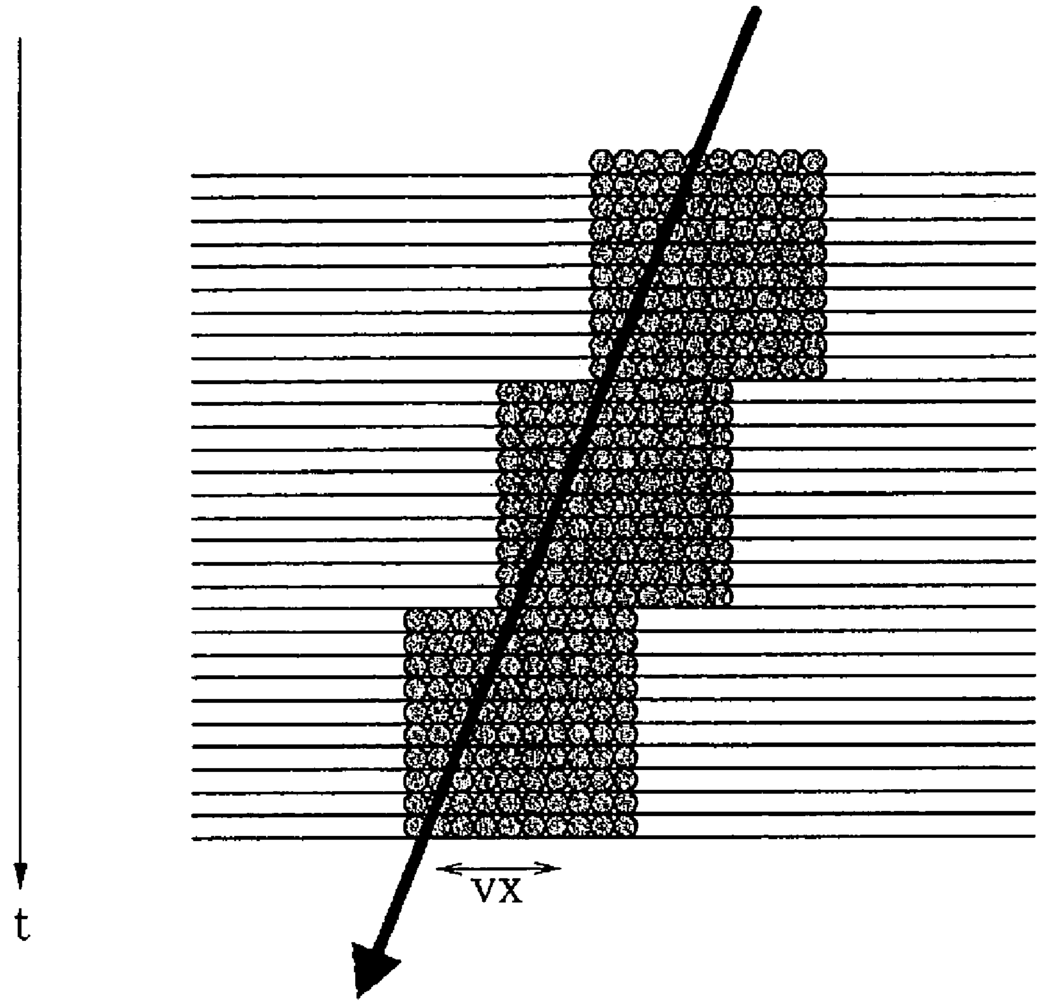
FIG. 22 is a diagram illustrating movement of a moving object displayed on a display under evaluation.

On the other hand, when a IUE is displayed on a display screen of a LCD placed as the display 11 under evaluation on the stage 14, an object moves on the captured image, for example, in such a manner as shown in FIG. 22.

In FIG. 22, the vertical axis indicates time elapsing from up to down in the figure, and each horizontal line indicates one captured image taken at a point of time. Circles on each captured image indicate pixels (of the observing display 18A) that represent the moving object on the captured image. In FIG. 22, an arrow pointing from upper right to lower left indicates a change in the position of the moving object on the captured image with time, and vx indicates the amount of motion of the moving object to left per field.

The LCD has the property that each pixel of the display screen maintains its pixel value representing an image over a period corresponding to one field (one frame). At a time at which to start displaying of a next field of image after a period of a previous field of image is complete, each pixel of the display screen emits light at a level corresponding to a pixel value to display the next field of image, and each pixel maintains emission at this level until a time to start displaying a further next field of image is reached. Because of this property of the LCD, an after-image occurs. In the example shown in FIG. 22, ten shots are taken in a period in which one field of image is displayed on the screen of the display 11 under evaluation. Note that the moving object on the captured image remains at the same position during each period in which one field of image is displayed, and the moving object on the captured image moves (shifts) to left in FIG. 22 by vx at each field-to-field transition.

In the case in which the display 11 under evaluation is a LCD, the normalization unit 318 spatially shifts each captured image in the direction in which the moving object moves, calculates the average values of pixel values of the image of the moving object displayed on the display 11 under evaluation on each captured image, and generates an average image of captured images.

Figure 20:
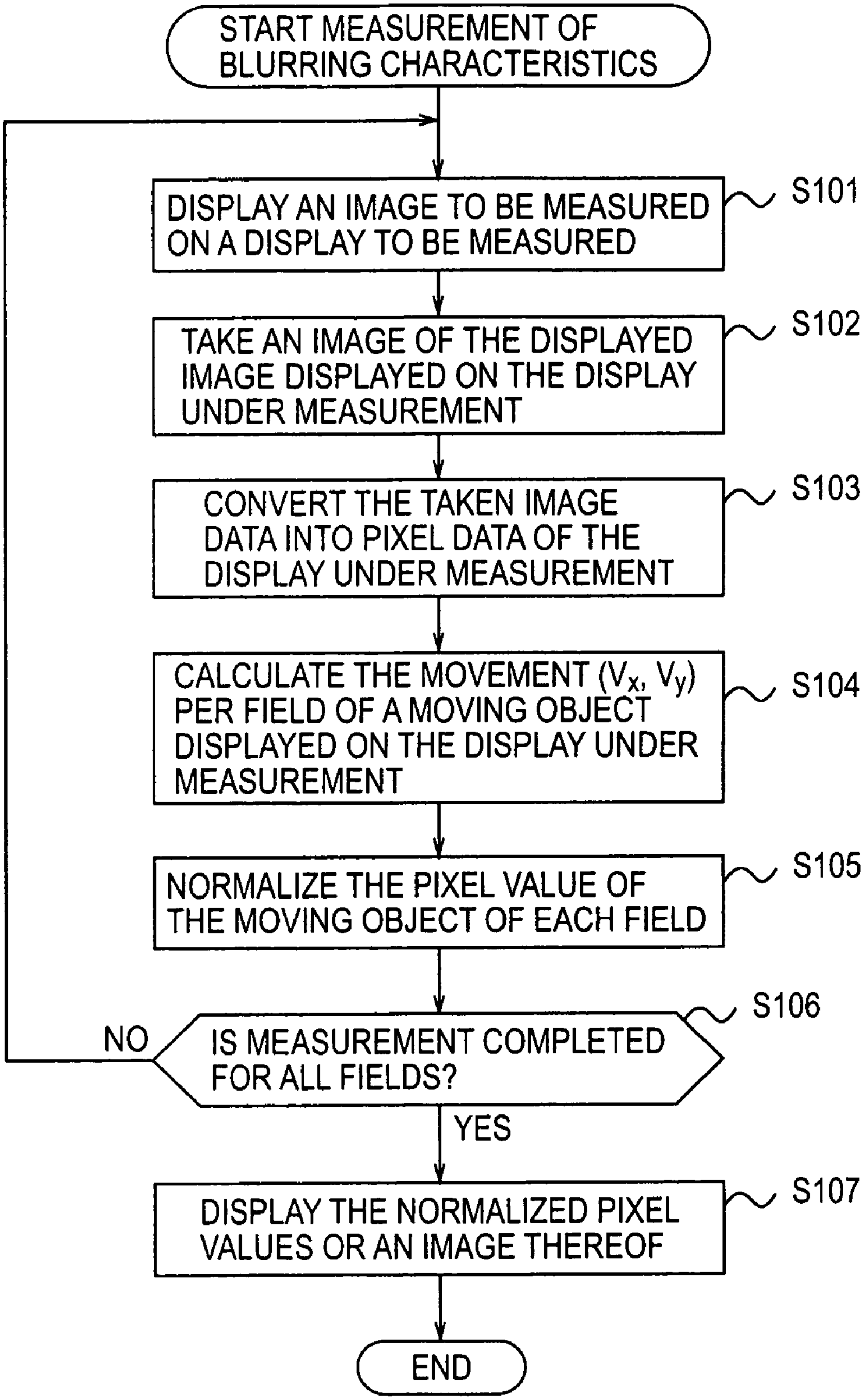
FIG. 20 is a flow chart showing a process of measuring a blur characteristic.

Referring again to the flow chart shown in FIG. 20, if the normalization unit 318 completes the normalization of pixel values of the moving object displayed on the display 11 under evaluation on the respective captured images, then in step S106, the determination unit 319 determines whether measurement is completed for all fields of the IUE.

If it is determined in step S106 that the measurement is not completed for all fields of the IUE, the processing flow returns to step S101 to repeat the process from step S101.

On the other hand, if it is determined in step S106 that the measurement is completed for all fields of the IUE, the process proceeds to step S107. In step S107, the display unit 311 displays an image of the display 11 under evaluation on the observing display 18A in accordance with the normalized pixel values or in accordance with pixel data based on the normalized pixel values. Thus the process is complete.

Figure 23:
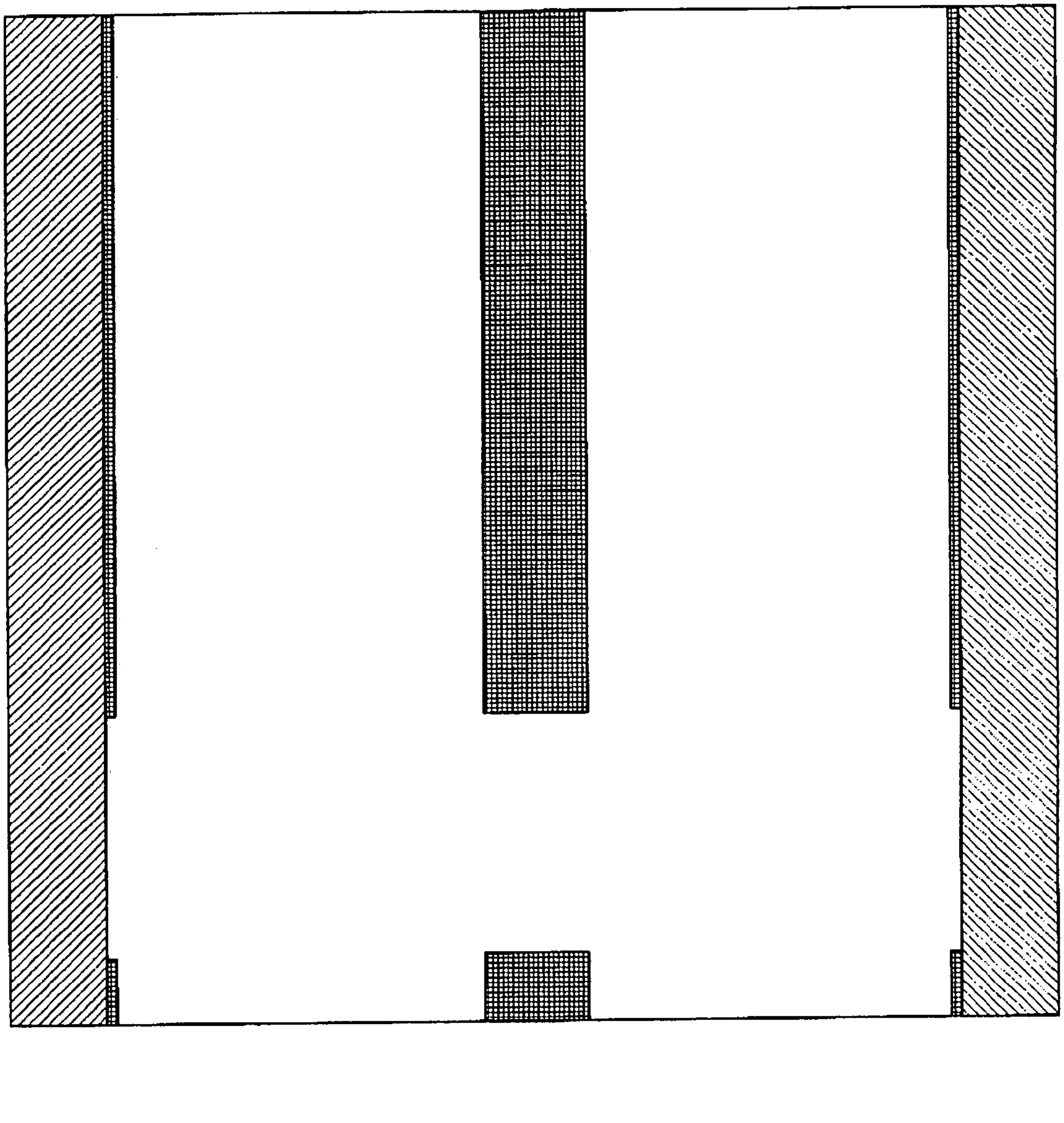
FIG. 23 illustrates an example of an image representing a blur due to motion.

FIG. 23 shows an example of an image that is displayed on the observing display 18A and that represents a possible blur caused by motion that occurs when a CRT is used as the display 11 under evaluation. In FIG. 23, a rectangle including an array of squares in the center of the figure is a moving object displayed on the CRT under evaluation, that is, the display 11 under evaluation. Each of squares included in the rectangle located in the center of the figure is a pixel of the display 11 under evaluation. The moving object moves on the display screen of the CRT from left to right.

In FIG. 23, the image of the moving object does not have a blur even in the moving direction (from left to right). In this case, when this moving object displayed on the CRT is viewed by human eyes, no blur due to motion occurs. That is, the image of the moving object does not have a blur when viewed by human eyes.

Figure 24:
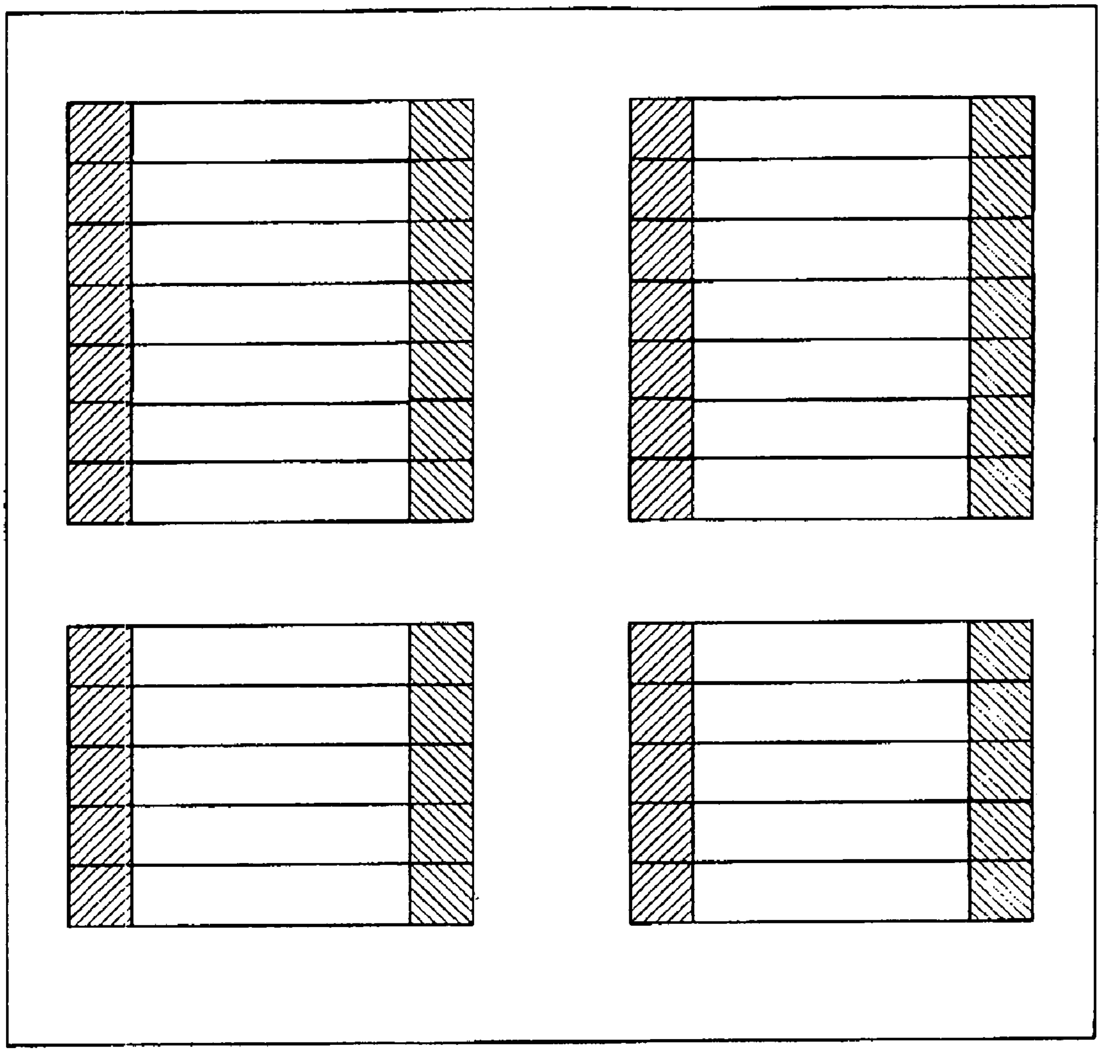
FIG. 24 illustrates an example of an image representing a blur due to motion.

FIG. 24 shows another example of an image displayed on the observing display 18A. In this example, the image displayed on the observing display 18A represents a blur that will be perceivable by human eyes when an image of the same moving object shown in FIG. 23 is displayed on a LCD under evaluation (the display 11 under evaluation.

In FIG. 24, the image of the moving object includes a rectangular area 581 shaded with no hatching lines, a rectangular area 582 shaded with hatching lines sloping downwards from left to right, and a rectangular area 583 shaded with hatching lines sloping upwards from left to right. The rectangular area 581 shaded with no hatching lines is a blur area in which, unlike the image shown in FIG. 23, captured pixel images of the display 11 under evaluation are horizontally superimposed and pixels of the image cannot be recognized as an image of the moving object.

In FIG. 24, the rectangular area 582 shaded with hatching lines sloping downwards from left to right is located on a right-hand side of the area 581 and represents an area corresponding to a right-hand edge (a boundary between the moving object and a background) of the moving object. The image of the area 582 is displayed at luminance lower than the luminance of the image of the area 581 because of a blur of the edge of the moving object. Similarly, in FIG. 24, the rectangular area 583 shaded with hatching lines sloping upwards from left to right is located on a left-hand side of the area 581 and represents an area corresponding to a left-hand edge (a boundary between the moving object and the background) of the moving object. The image of the area 583 is also displayed at luminance lower than the luminance of the image of the area 581 because of a blur of the edge of the moving object.

As described above, in the example shown in FIG. 24, unlike the example shown in FIG. 23, the image of the moving object expands in the horizontal direction over an area about 1.5 times wider than the original width, a blur occurs in the main part and at edges of the image of the moving object.

Figure 25:
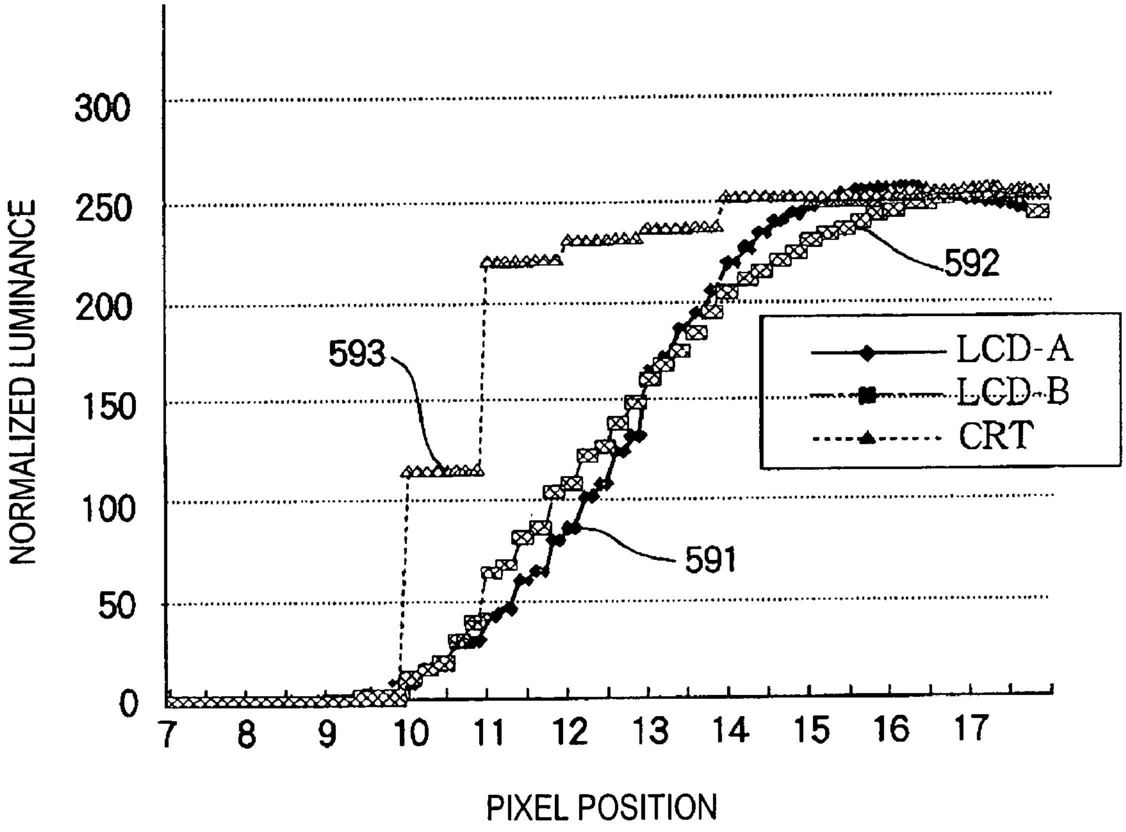
FIG. 25 is a plot of the luminance value of pixel representing a blur due to motion.

As shown in FIG. 25, the display unit 311 may display, on the observing display 18A, normalized luminance values of pixels of the display 11 under evaluation on the captured image in accordance with the normalized pixel values of the display 11 under evaluation supplied from the normalization unit 318.

In FIG. 25, the vertical axis indicates the normalized luminance value of pixels of the display 11 under evaluation, and the horizontal axis indicates positions of pixels of the observing display 18A relative to a particular position. For example, 7" on the horizontal axis denotes a seventh pixel position as counted in the direction in which the moving object moves from a first pixel position of the display 11 under evaluation corresponding to a reference pixel position of the observing display 18A.

Curves 591 and 592 indicate luminance of pixels of the display 11 under evaluation on the captured image as a function of the pixel position when the display 11 under evaluation is a LCD, and a curve 593 indicates luminance of pixels of the display 11 under evaluation on the captured image as a function of the pixel position when the display 11 under evaluation is a CRT.

In the case of the curve 593, in a range from the 9th pixel position to the 12th pixel position, the luminance changes abruptly between two adjacent pixels at boundaries. This means that the image of the moving object does not have a blur at edges. In contrast, in the case of the curves 591 and 592, in a range from the 10th pixel position to the 17th pixel position, the luminance of pixels of the display 11 under evaluation (LCD) increases gradually with the pixel position from left to right in the figure. This means that the image of the moving object has blurs at edges.

Figure 26:
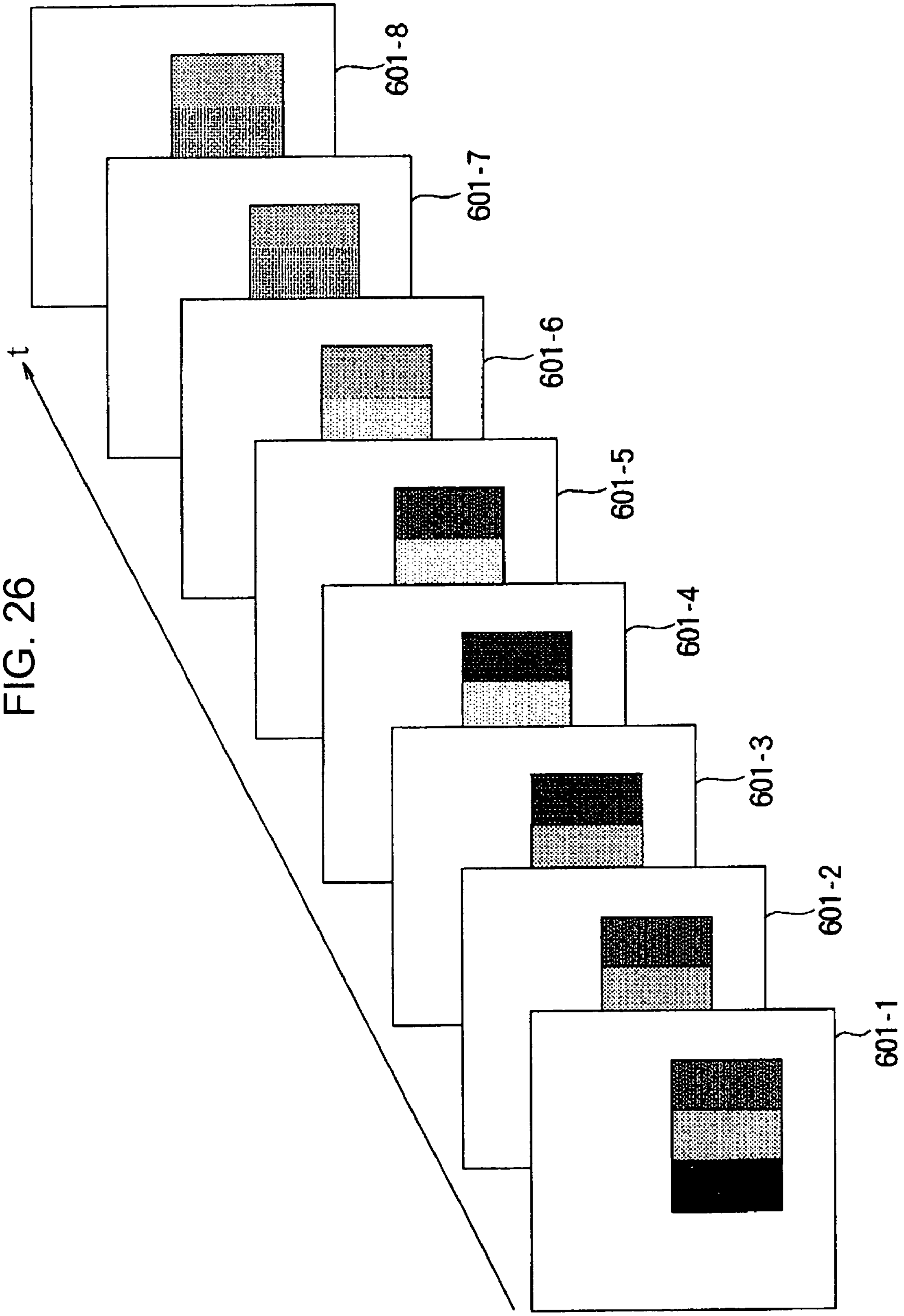
FIG. 26 illustrates captured images of subfields displayed on a display under evaluation.

FIG. 26 shows a series of captured images of the display screen of a PDP used as the display 11 under evaluation. In this example, an object moving from right to left in FIG. 26 is displayed on the PDP, the series of captured images of the display screen of the PDP was taken.

In FIG. 26, an arrow indicates passage of time, and captured images 601-1 to 601-8 are images of the display screen of the PDP evaluated as the display 11 under evaluation. In FIG. 26, captured images 601-1 to 601-8 are arranged in the same order as that in which they were taken. In FIG. 26, each of captured images 601-1 to 601-8 includes an image of the moving object, displayed in different colors depending on subfields. In the following discussion, captured images 601-1 to 601-8 will be referred to as captured images 601 unless it is needed to distinguish them.

Figure 27:
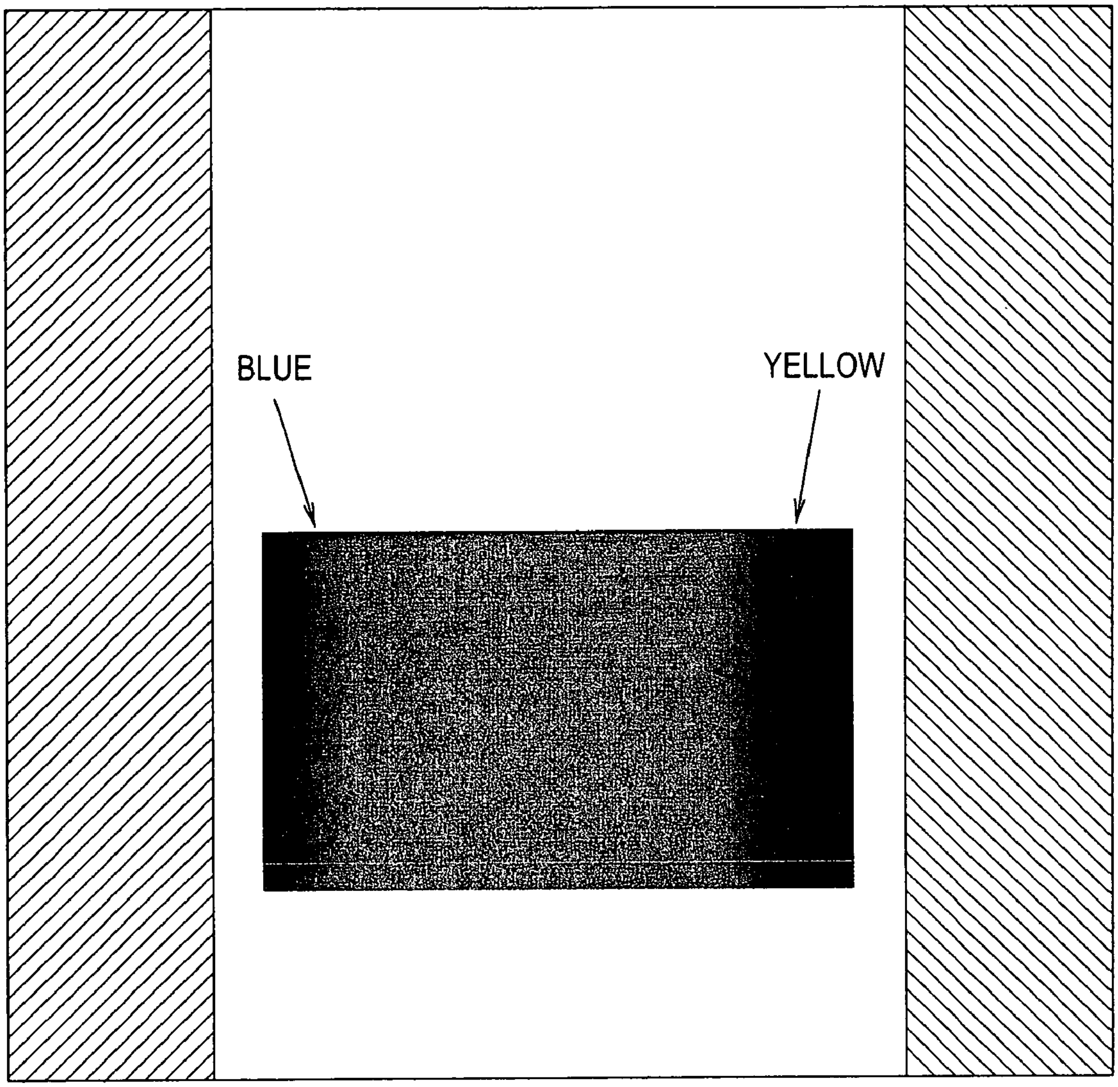
FIG. 27 illustrates an example of an image representing a blur due to motion.

If the data processing apparatus 18 spatially shifts the respective captured images 601-1 to 601-8 into the direction in which the moving object moves and superimposes the resultant captured images 601-1 to 601-8 by performing the process in steps S103 to S107 in the flow chart shown in FIG. 20, then, as a result, an image such as that shown in FIG. 27 is displayed on the observing display 18A.

More specifically, for example, the image shown in FIG. 27 is obtained by displaying a 4-field image on the PDP used as the display 11 under evaluation, and taking an image of the display screen of the PDP in this state thereby obtaining a superimposed image from a resultant captured image 601. The image shown in FIG. 27 represents blurs in color of the moving object displayed on the PDP.

In the example shown in FIG. 27, the moving object is displayed in the center of the image. The moving object moves from right to left in FIG. 27. The PDP has the property that red and green phosphors are slow in response compared with a blue phosphor. As a result, in FIG. 27, an area 701 on the right-hand side, from which the moving object has already gone, has yellow color, while an area 702 on the left-hand side, which is the leading end of the moving object, has blue color.

As described above, the data processing apparatus 18 converts the captured image data into data of respective pixels of the display 11 under evaluation in accordance with the equation which is determined in the calibration process so as to define the conversion from the captured image data to the pixel data of the display 11 under evaluation. Based on the pixel data, the data processing apparatus 18 then normalizes the pixel values of the moving object displayed on the display 11 under evaluation on the respective captured images.

By normalizing the pixel values of the moving object displayed on the display 11 under evaluation on the respective captured images based on the pixel data in the above-described manner, it is possible to exactly represent how human eyes perceive the image displayed on the display 11 under evaluation and it is also possible to analyze a change, with time, in the image of the moving object perceived by human. Furthermore, by normalizing the pixel values of the moving object displayed on the display 11 under evaluation, it becomes possible to numerically evaluate the image perceived by human eyes, based on normalized pixel values. This makes it possible to quantitatively analyze characteristics that are difficult to evaluate based on human vision characteristics.

When characteristics of the display 11 under evaluation are measured, the high-speed camera 12 takes an image of an image displayed on the display 11 under evaluation at a rate that allows it to take at least as many images (frames) as the number of subfield images per second. More specifically, for example, it is desirable that the high-speed camera 12 take as many frames of image per second as about 10 times the field frequency. This makes it possible for the high-speed camera 12 to take a plurality of images for one subfield image and calculate the average of pixel values of the plurality of images, which allows more accurate measurement.

The above-described method of determining pixel data of the display 11 under evaluation from data of captured image of a display screen of the display 11 under evaluation and measuring a characteristic of the display 11 under evaluation based on the resultant pixel data can also be applied to, for example, debugging of a display device at a developing stage, editing of a movie or an animation, etc.

For example, in editing of a movie or an animation, by evaluating how an input image will be perceived when the input image is displayed on a display, it is possible to perform editing so as to minimize a blur due to motion or a blur in color.

For example, by measuring characteristics of a display device produced by a certain company and also characteristics of a display device produced by another company under the same measurement conditions and comparing measurement results, it is possible to analyze the difference in technology based on which displays are designed. For example, this makes it possible to check whether a display is based on a technique according to a particular patent.

As described above, in the present invention, a plurality of shots of an image displayed on a display apparatus to be evaluated are taken during a period corresponding one field. This allows it to measure and evaluate a time-response characteristic of the display apparatus in a short time. Data of respective pixels of the display apparatus under evaluation is determined from data obtained by taking an image of the display screen of the display apparatus under evaluation. This allows it to quickly and accurately measure and evaluate the characteristic of the display apparatus under evaluation.

In the measurement system 1, of various units such as the high-speed camera 12, the video signal generator 15, the synchronization signal generator 16, and the controller 17, arbitrary one or more thereof may be incorporated into the data processing apparatus 18. When a characteristic of the display 11 under evaluation is measured, captured image data obtained via the high-speed camera 12 may be stored in a removable storage medium 131 such as an optical disk or a magnetic disk, and the captured image data may be read from the removable storage medium 131 and supplied to the data processing apparatus 18.

Of a plurality of fields of images used to measure a characteristic of the display 11 under evaluation, the first field of image may be displayed as a test image on the display 11 under evaluation in the calibration process. After the calibration process is completed, fields following the first field may be displayed on the display 11 under evaluation and an image thereof may be taken to evaluate the characteristic of the display 11 under evaluation.

The sequence of processing steps described above may be performed by means of hardware or software. When the processing sequence is executed by software, a program forming the software may be installed from a storage medium onto a computer which is provided as dedicated hardware or may be installed onto a general-purpose personal computer capable of performing various processes in accordance with various programs installed thereon.

An example of such a storage medium usable for the above purpose is a removable storage medium, such as the removable storage medium 131 shown in FIG. 2, on which a program is stored and which is supplied to a user separately from a computer. Specific examples include a magnetic disk (such as a flexible disk), an optical disk (such as a CD-ROM (Compact Disk-Read Only Memory) and a DVD (Digital Versatile Disk)), a magnetooptical disk (such as a MD (Mini-Disc (trademark)), and a semiconductor memory. A program may also be supplied to a user by preinstalling it on the built-in ROM 122 or the storage unit 128 including a hard disk disposed in the computer.

The program for executing the processes may be installed on the computer, as required, via an interface such as a router or a modem by downloading via a wired or wireless communication medium such as a local area network, the Internet, or digital satellite broadcasting.

In the present description, the steps described in the program stored in the storage medium may be performed either in time sequence in accordance with the order described in the program or in a parallel or separate fashion.

In the present description, the term "system" is used to describe a whole of a plurality of apparatus organized such that they function as a whole.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:

calculation means for performing a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size, as that of the first area, whereby the size of the image of the pixel of the display under evaluation on the captured image, and the angle of the first area with respect to the image of the pixel of the display under evaluation on the captured image are determined from a result of the comparison; and conversion means for converting data of the captured image of the display under evaluation into data of each pixel of the display under evaluation, based on the size of the image of the pixel and the angle of the first area.

2. The information processing apparatus according to claim 1, wherein in the calculation performed by the calculation means, an area with a size substantially equal to the size of the image of the pixel is employed as the first area.

3. The information processing apparatus according to claim 1, wherein in the calculation performed by the calculation means, a rectangular area located at a substantial center of the captured image of the display under evaluation is selected as the first area, the display under evaluation being displaying a cross hatch pattern in the form of a two-dimensional array of a plurality of first blocks arranged closely adjacent to each other, first two sides of each first block being formed by lines extending parallel to a first direction of an array of pixels of the display under evaluation, second two sides of each first block being formed by lines extending parallel to a second direction perpendicular to the first direction, the captured image being obtained by taking an image of the display under evaluation when the cross hatch pattern is displayed on the display under evaluation, the rectangular area selected as the first area having a size substantially equal to the size of the image of one first block on the captured image.

4. The information processing apparatus according to claim 1, wherein in the conversion of data performed by the conversion means, the captured image of the display under evaluation to be converted into data of each pixel of the display under evaluation is obtained by taking an image of the display under evaluation for an exposure period shorter than a period during which one field or one frame is displayed.

5. An information processing method comprising the steps of:

performing a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison; and converting data of the captured image of the display under evaluation into data of each pixel of the display under evaluation, based on the size of the image of the pixel and the angle of the first area.

6. A storage medium in which a program to be executed by a computer is stored, the program comprising the steps of:

performing a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison; and converting data of the captured image of the display under evaluation into data of each pixel of the display under evaluation, based on the size of the image of the pixel and the angle of the first area.

7. A non-transitory computer readable storage medium storing a computer program for causing a computer to:

perform a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison; and convert data of the captured image of the display under evaluation into data of each pixel of the display under evaluation, based on the size of the image of the pixel and the angle of the first area.

8. An information processing apparatus comprising:

a processor; and a memory device which stores a plurality of instructions, which when executed by the processor, causes the processor to:

perform a calculation such that a pixel value of a pixel in a first area is compared with a pixel value of a pixel in a second area, the first area being located at a substantial center of a captured image obtained by taking an image of a display which is to be evaluated and which is displaying an image, the first area having a size having a particular relationship with the size of a pixel of the display under evaluation on the captured image, the second area being located at a position different from the position of the first area on the captured image and having the same size as that of the first area, whereby the size of the image of the pixel of the display under evaluation on the captured image, and the angle of the first area with respect to the image of the pixel of the display under evaluation on the captured image are determined from a result of the comparison; and convert data of the captured image of the display under evaluation into data of each pixel of the display under evaluation, based on the size of the image of the pixel and the angle of the first area.

* * * * *